US012235652B2

United States Patent
Whitman et al.

(10) Patent No.: US 12,235,652 B2
(45) Date of Patent: *Feb. 25, 2025

(54) TERRAIN AWARE STEP PLANNING SYSTEM

(71) Applicant: Boston Dynamics, Inc., Waltham, MA (US)

(72) Inventors: Eric Whitman, Waltham, MA (US); Gina Christine Fay, Lexington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,318

(22) Filed: Feb. 24, 2022

(65) Prior Publication Data

US 2022/0179420 A1 Jun. 9, 2022

Related U.S. Application Data

(63) Continuation of application No. 16/288,205, filed on Feb. 28, 2019, now Pat. No. 11,287,826.

(Continued)

(51) Int. Cl.
*G05D 1/00* (2006.01)
*G06T 7/593* (2017.01)

(52) U.S. Cl.
CPC ........... *G05D 1/024* (2013.01); *G05D 1/0251* (2013.01); *G06T 7/593* (2017.01)

(58) Field of Classification Search
CPC .... G05D 1/0212; G05D 1/0238; G05D 1/024; G05D 1/0251; G05D 1/0248;

(Continued)

(56) References Cited

U.S. PATENT DOCUMENTS

| 5,111,401 A | 5/1992 | Everett et al. |
| 5,307,271 A | 4/1994 | Everett et al. |

(Continued)

FOREIGN PATENT DOCUMENTS

| CA | 2928262 A1 | 7/2012 |
| CN | 103413313 A | 11/2013 |

(Continued)

OTHER PUBLICATIONS

International Preliminary Report on Patentability received in International Application No. PCT/US2019/046646, dated Apr. 8, 2021, in 7 pages.

(Continued)

*Primary Examiner* — Russell Frejd
*Assistant Examiner* — Brandon Z Willis
(74) *Attorney, Agent, or Firm* — Knobbe, Martens, Olson & Bear, LLP

(57) ABSTRACT

A method for terrain and constraint planning a step plan includes receiving, at data processing hardware of a robot, image data of an environment about the robot from at least one image sensor. The robot includes a body and legs. The method also includes generating, by the data processing hardware, a body-obstacle map, a ground height map, and a step-obstacle map based on the image data and generating, by the data processing hardware, a body path for movement of the body of the robot while maneuvering in the environment based on the body-obstacle map. The method also includes generating, by the data processing hardware, a step path for the legs of the robot while maneuvering in the environment based on the body path, the body-obstacle map, the ground height map, and the step-obstacle map.

20 Claims, 14 Drawing Sheets

Related U.S. Application Data

(60) Provisional application No. 62/744,954, filed on Oct. 12, 2018.

(58) Field of Classification Search
CPC .......... G05D 1/0274; G05D 2201/0217; G06T 7/593; G06T 7/55; G06T 7/70; G06T 2207/10028; G06T 2207/30241; B25J 9/1664; B25J 9/1666; B25J 19/021; B62D 57/02; B62D 57/032
See application file for complete search history.

(56) References Cited

U.S. PATENT DOCUMENTS

| | | | |
|---|---|---|---|
| 5,378,969 | A | 1/1995 | Haikawa |
| 7,211,980 | B1 | 5/2007 | Bruemmer et al. |
| 7,769,491 | B2 * | 8/2010 | Fukuchi ............... G05D 1/0251 701/1 |
| 7,865,267 | B2 * | 1/2011 | Sabe ................... G05D 1/0251 382/153 |
| 7,912,583 | B2 * | 3/2011 | Gutmann ............... G06V 20/10 700/258 |
| 8,270,730 | B2 | 9/2012 | Watson |
| 8,346,391 | B1 | 1/2013 | Anhalt et al. |
| 8,548,734 | B2 | 10/2013 | Barbeau et al. |
| 8,849,494 | B1 | 9/2014 | Herbach et al. |
| 8,930,058 | B1 | 1/2015 | Quist et al. |
| 9,352,470 | B1 | 5/2016 | da Silva et al. |
| 9,395,726 | B1 | 7/2016 | Rizzi et al. |
| 9,561,592 | B1 | 2/2017 | Silva et al. |
| 9,586,316 | B1 | 3/2017 | Swilling |
| 9,594,377 | B1 | 3/2017 | Perkins et al. |
| 9,717,387 | B1 | 8/2017 | Szatmary et al. |
| 9,789,607 | B1 | 10/2017 | Whitman |
| 9,868,210 | B1 | 1/2018 | Whitman |
| 9,908,240 | B1 | 3/2018 | da Silva et al. |
| 9,933,781 | B1 | 4/2018 | Bando et al. |
| 9,969,086 | B1 | 5/2018 | Whitman |
| 9,975,245 | B1 | 5/2018 | Whitman |
| 10,017,218 | B1 | 7/2018 | Swilling et al. |
| 10,059,392 | B1 | 8/2018 | Fay et al. |
| 10,081,098 | B1 | 9/2018 | Nelson et al. |
| 10,081,104 | B1 | 9/2018 | Swilling |
| 10,144,465 | B1 | 12/2018 | Swilling et al. |
| 10,196,104 | B1 | 2/2019 | Kagami et al. |
| 10,226,870 | B1 | 3/2019 | Silva et al. |
| 10,266,220 | B2 | 4/2019 | Swilling et al. |
| 10,399,621 | B2 | 9/2019 | Swilling et al. |
| 11,059,532 | B1 | 7/2021 | Fay et al. |
| 11,073,842 | B1 | 7/2021 | Whitman et al. |
| 11,123,869 | B2 | 9/2021 | Whitman et al. |
| 11,175,664 | B1 | 11/2021 | Boyraz |
| 11,268,816 | B2 | 3/2022 | Fay et al. |
| 11,287,826 | B2 | 3/2022 | Whitman et al. |
| 11,319,005 | B2 | 5/2022 | Swilling et al. |
| 11,383,381 | B2 | 7/2022 | Whitman et al. |
| 11,416,003 | B2 | 8/2022 | Whitman et al. |
| 11,447,195 | B2 | 9/2022 | Whitman |
| 11,465,281 | B2 | 10/2022 | Whitman et al. |
| 11,480,974 | B2 | 10/2022 | Lee et al. |
| 11,518,029 | B2 | 12/2022 | Cantor et al. |
| 11,548,151 | B2 | 1/2023 | Whitman et al. |
| 11,599,128 | B2 | 3/2023 | Whitman et al. |
| 11,660,752 | B2 | 5/2023 | Whitman et al. |
| 11,691,292 | B2 | 7/2023 | Klingensmith et al. |
| 11,712,802 | B2 | 8/2023 | Chestnutt et al. |
| 11,774,237 | B2 | 10/2023 | Fay et al. |
| 11,851,120 | B2 | 12/2023 | Fay et al. |
| 11,927,961 | B2 | 3/2024 | Fay et al. |
| 11,999,423 | B2 | 6/2024 | Whitman |
| 12,038,752 | B1 | 7/2024 | Blanton et al. |
| 2005/0131581 | A1 | 6/2005 | Sabe et al. |
| 2006/0025888 | A1 | 2/2006 | Gutmann et al. |
| 2006/0167621 | A1 | 7/2006 | Dale |
| 2007/0282564 | A1 | 12/2007 | Sprague et al. |
| 2008/0009966 | A1 | 1/2008 | Bruemmer et al. |
| 2008/0027590 | A1 | 1/2008 | Phillips et al. |
| 2008/0086241 | A1 | 4/2008 | Phillips et al. |
| 2009/0099689 | A1 * | 4/2009 | Takenaka ............ B62D 57/032 901/1 |
| 2009/0125225 | A1 | 5/2009 | Hussain et al. |
| 2010/0066587 | A1 | 3/2010 | Yamauchi et al. |
| 2010/0172571 | A1 | 7/2010 | Yoon et al. |
| 2011/0172850 | A1 | 7/2011 | Paz-Meidan et al. |
| 2012/0089295 | A1 | 4/2012 | Ahn et al. |
| 2012/0182392 | A1 | 7/2012 | Kearns et al. |
| 2013/0141247 | A1 | 6/2013 | Ricci |
| 2013/0231779 | A1 | 9/2013 | Purkayastha et al. |
| 2013/0325244 | A1 | 12/2013 | Wang et al. |
| 2014/0188325 | A1 | 7/2014 | Johnson et al. |
| 2015/0158182 | A1 | 6/2015 | Farlow et al. |
| 2015/0253775 | A1 | 9/2015 | Jacobus et al. |
| 2015/0355638 | A1 | 12/2015 | Field et al. |
| 2015/0362921 | A1 | 12/2015 | Hanaoka et al. |
| 2017/0131102 | A1 | 5/2017 | Wirbel et al. |
| 2017/0168488 | A1 | 6/2017 | Wierzynski et al. |
| 2017/0176990 | A1 | 6/2017 | Keller et al. |
| 2017/0203446 | A1 | 7/2017 | Dooley et al. |
| 2018/0173242 | A1 * | 6/2018 | Lalonde ............... G05D 1/0274 |
| 2018/0218513 | A1 | 8/2018 | Ho |
| 2018/0364717 | A1 | 12/2018 | Douillard et al. |
| 2019/0079523 | A1 | 3/2019 | Zhu et al. |
| 2019/0080463 | A1 | 3/2019 | Davison et al. |
| 2019/0100306 | A1 | 4/2019 | Pohl et al. |
| 2019/0138029 | A1 | 5/2019 | Ryll et al. |
| 2019/0171911 | A1 | 6/2019 | Greenberg |
| 2019/0187703 | A1 | 6/2019 | Millard et al. |
| 2019/0213896 | A1 | 7/2019 | Gohl et al. |
| 2019/0258737 | A1 | 8/2019 | Wang et al. |
| 2019/0318277 | A1 | 10/2019 | Goldman et al. |
| 2020/0117198 | A1 | 4/2020 | Whitman et al. |
| 2020/0117214 | A1 | 4/2020 | Jonak et al. |
| 2020/0192388 | A1 | 6/2020 | Zhang et al. |
| 2020/0249033 | A1 | 8/2020 | Gelhar |
| 2020/0333790 | A1 | 10/2020 | Kobayashi et al. |
| 2020/0409382 | A1 | 12/2020 | Herman et al. |
| 2021/0041243 | A1 | 2/2021 | Fay et al. |
| 2021/0041887 | A1 | 2/2021 | Whitman et al. |
| 2021/0141389 | A1 | 5/2021 | Jonak et al. |
| 2021/0147017 | A1 | 5/2021 | Swilling et al. |
| 2021/0331754 | A1 | 10/2021 | Whitman |
| 2022/0024034 | A1 | 1/2022 | Wei et al. |
| 2022/0083062 | A1 | 3/2022 | Jaquez et al. |
| 2022/0137637 | A1 | 5/2022 | Baldini et al. |
| 2022/0155078 | A1 | 5/2022 | Fay et al. |
| 2022/0193898 | A1 | 6/2022 | Aghasadeghi et al. |
| 2022/0194245 | A1 | 6/2022 | Gonano et al. |
| 2022/0276654 | A1 | 9/2022 | Lee et al. |
| 2022/0324104 | A1 | 10/2022 | Whitman et al. |
| 2022/0342421 | A1 | 10/2022 | Kearns et al. |
| 2022/0374024 | A1 | 11/2022 | Whitman et al. |
| 2022/0388170 | A1 | 12/2022 | Merewether |
| 2022/0390950 | A1 | 12/2022 | Yamauchi |
| 2022/0390952 | A1 | 12/2022 | Yu et al. |
| 2022/0390954 | A1 | 12/2022 | Klingensmith |
| 2022/0410390 | A1 | 12/2022 | Whitman et al. |
| 2023/0008677 | A1 | 1/2023 | Whitman et al. |
| 2023/0143315 | A1 | 5/2023 | Whitman et al. |
| 2023/0234229 | A1 | 7/2023 | Fay et al. |
| 2023/0286167 | A1 | 9/2023 | Klingensmith et al. |
| 2023/0321830 | A1 | 10/2023 | Fay et al. |
| 2023/0400307 | A1 | 12/2023 | Fay et al. |
| 2023/0415343 | A1 | 12/2023 | Whitman |
| 2024/0075998 | A1 | 3/2024 | Fay et al. |
| 2024/0174310 | A1 | 5/2024 | Whitman |

FOREIGN PATENT DOCUMENTS

| | | |
|---|---|---|
| CN | 203371557 | 1/2014 |
| CN | 108052103 | 5/2018 |
| CN | 111604916 | 9/2020 |
| CN | 211956515 | 11/2020 |
| CN | 112034861 | 12/2020 |
| CN | 113168184 | 7/2021 |

(56) References Cited

FOREIGN PATENT DOCUMENTS

| | | |
|---|---|---|
| CN | 113633219 | 11/2021 |
| CN | 114503043 A | 5/2022 |
| JP | H02127180 A | 5/1990 |
| JP | H09134217 | 11/2003 |
| JP | 2005-088189 | 4/2005 |
| JP | 200611880 A | 1/2006 |
| JP | 2006-239844 | 9/2006 |
| JP | 2007041656 A | 2/2007 |
| JP | 2008072963 | 4/2008 |
| JP | 2009-223628 | 10/2009 |
| JP | 2009271513 A | 11/2009 |
| JP | 2010-253585 | 11/2010 |
| JP | 2013250795 | 12/2013 |
| JP | 2014123200 | 7/2014 |
| JP | 2014-151370 | 8/2014 |
| JP | 2016081404 | 5/2016 |
| JP | 2016103158 | 6/2016 |
| JP | 2022-504039 | 1/2022 |
| JP | 2022543997 A | 10/2022 |
| JP | 7219812 | 2/2023 |
| KR | 101121763 B1 | 3/2012 |
| KR | 20120019893 A | 3/2012 |
| KR | 20220083666 A | 6/2022 |
| KR | 10-2023-0019497 | 2/2023 |
| KR | 10-2533690 | 5/2023 |
| KR | 10-2492242 | 6/2023 |
| WO | WO 2007/051972 | 5/2007 |
| WO | WO 2017/090108 | 6/2017 |
| WO | WO 2018231616 A1 | 12/2018 |
| WO | WO 2020/076418 | 4/2020 |
| WO | WO 2021/025708 A1 | 2/2021 |
| WO | WO 2022/256812 A1 | 12/2022 |

OTHER PUBLICATIONS

Japanese Office Action received in Japanese Application No. JP 2021-517959, dated May 23, 2022.
Notice of Allowance received in Korean Patent Application No. KR 10-2021-7010325 dated Oct. 19, 2022.
Notice of Allowance received in Korean Patent Application No. KR 10-2023-7002441 dated Feb. 27, 2023.
Korean Patent Office, Korean Office Action for the related Application No. 10-2021-7010325, dated Apr. 20, 2022, 31 pages.
International Search Report, PCT/US2019/046646, dated Oct. 31, 2019, 13 pages.
Abraham et al., "A Topological Approach of Path Planning for Autonomous Robot Navigation in Dynamic Environments", The 2009 IEEE/RSJ International Conference on Intelligent Robots and Systems, Oct. 11-15, 2009.
Alkautsar, "Topological Path Planning and Metric Path Planning",|https://medium.com/@arifmaulanaa/topological-path-planning-and-metric-path-planning-5c0fa7f107f2, downloaded Feb. 13, 2023, 3 pages.
Bajracharya et al., "High fidelity day/night stereo mapping with vegetation and negative obstacle detection for vision-in-the-loop walking," 2013 IEEE/RSJ International Conference on Intelligent Robots and Systems, Nov. 3, 2013; pp. 3663-3670.
Boost.org, "buffer (with strategies)", https://www.boost.org/doc/libs/1_75_0/libs/geometry/doc/html/geometry/reference/algorithms/buffer/buffer_7_with_strategies.html, downloaded Feb. 1, 2023, 5 pages.
Buchegger et al., "An Autonomous Vehicle for Parcel Delivery in Urban Areas" International Conference on Intelligent Transporation Sytems (ITSC) Nov. 2018.
Cao, "Topological Path Planning for Crowd Navigation", https://www.ri.cmu.edu/app/uploads/2019/05/thesis.pdf, May 2019, 24 pages.
Collins et al. "Efficient Planning for High-Speed MAV Flight in Unknown Environments Using Online Sparse Topological Graphs" IEEE International Conference on Robotics and Automation (ICRA) Aug. 2020.
Github.com, "cartographer-project/cartographer", https://github.com/cartographer-project/cartographer, downloaded Feb. 1, 2023, 4 pages.

Hines et al., "Virtual surfaces and attitude aware planning and behaviours for negative navigation," IEEE Robotics and Automation Letters, Apr. 2021, vol. 6, No. 2, pp. 4048-4055.
Karunasekera et al., "Stereo vision based negative obstacle detection," 2017 13th IEEE International Conference on Control & Automation (ICCA), Jul. 3, 2017; pp. 834-838.
Kuipers et al., "A Robot Exploration and Mapping Strategy Based on a Semantic Hierarchy of Spatial Representations" Journal of Robotics & Autonomous Systems vol. 8, 1991, pp. 47-63.
Larson et al., "Lidar based off-road negative obstacle detection and analysis," IEEE 14th Conference on Intelligent Transportation Systems, Washington, D.C., Oct. 5-7, 2011, 8 pages.
Leon et al., "TIGRE: Topological Graph based Robotic Exploration", 2017 European Conference on Mobile Robots (ECMR), Paris, France, 2017, pp. 1-6, doi: 10.1109/ECMR.2017.8098718.
McCammon et al., "Topological path planning for autonomous information gathering", Auton Robot 45, 821-842 (2021) https://doi.org/10.1007/s10514-021-10012-x.
Mendes et al., "ICP-based pose-graph SLAM", International Symposium on Safety, Security and Rescue Robotics (SSRR), Oct. 2016, Lausanne, Switzerland, pp. 195-200, ff10.1109/SSRR.2016.7784298, hal-01522248.
Poncela et al., "Efficient integration of metric and topological maps for directed exploration of unknown environments", Robotics and Autonomous Systems, Elsevier BV, Amsterdam, NL, vol. 41, No. 1, Oct. 31, 2002 (Oct. 31, 2002), p. 21-39.
Tang, "Introduction to Robotics", The Wayback Machine,https://web.archive.org/web/20160520085742/http://www.cpp.edu:80/~ftang/courses/CS521/, downloaded Feb. 3, 2023, 58 pages.
Thrun et al, "The GraphSLAM Algorithm with Applications to Large-Scale Mapping of Urban Structures", The International Journal of Robotics Research, vol. 25, No. 5-6, May-Jun. 2006, pp. 403-429.
Video game, "Unreal Engine 5", https://docs.unrealengine.com/5.0/en-US/basic-navigation-in-unreal-engine/, downloaded Feb. 1, 2023, 15 pages.
Whelan et al, "ElasticFusion: Dense SLAM Without a Pose Graph", http://www.roboticsproceedings.org/rss11/p01.pdf, downloaded Feb. 1, 2023, 9 pages.
Wikipedia.org, "Buffer (GIS)", http://wiki.gis.com/wiki/index.php/Buffer_(GIS)#:~:text=A%20'polygon%20buffer'%20is%20a,Buffer%20around%20line%20features, downloaded Feb. 1, 2023, 4 pages.
Wikipedia.org, "Probabilistic roadmap", https://en.wikipedia.org/wiki/Probabilistic_roadmap, downloaded Feb. 1, 2023, 2 pages.
Wikipedia.org, "Rapidly-exploring random tree", https://en.wikipedia.org/wiki/Rapidly-exploring_random_tree, downloaded Feb. 1, 2023, 7 pages.
Wikipedia.org, "Visibility graph", https://en.wikipedia.org/wiki/Visibility_graph, downloaded Feb. 1, 2023, 3 pages.
Yamauchi et al. "Place Recognition in Dynamic Environments" Journal of Robotic Systems, Special Issue on Mobile Robots, vol. 14, No. 2, Feb. 1997, pp. 107-120.
Yamauchi et al. "Spatial Learning for Navigation in Dynamic Environments" IEEE Transactions on Systems, Man, and Cybernetics—Part B: Cybernetics, Special Issue on Learning Autonomous Robots, vol. 26, No. 3, Jun. 1996, pp. 496-505.
International Search Report and Written Opinion, PCT/US/2019/051511, dated Jul. 1, 2020, 15 pages.
International Search Report and Written Opinion, PCT/US2022/072704, dated Sep. 28, 2022, 17 pages.
Boston Dynamics, "LS3—Legged Squad Support System," video screen shots taken from https://www.youtube.com/watch?v=R7ezXBEBE6U&t=1s, Sep. 10, 2012, downloaded Feb. 2, 2024, 5 pages.
Stanford, "BigDog, the Rough-Terrain Robot," video screen shots taken from https://www.youtube.com/watch?v=-Bi-tPO0OPs, Aug. 27, 2010, downloaded Apr. 26, 2024, 12 pages.
"Boston Dynamics BIGDOG Robot," video screen shots taken from https://www.youtube.com/watch?v=b2bExqhhWRI, Jul. 17, 2007, downloaded Oct. 5, 2023, 13 pages.
"AlphaDog Proto," video screen shots taken from https://www.youtube.com/watch?v=SSbZrQp-HOk, Sep. 29, 2011, downloaded Aug. 14, 2023, 24 pages.

(56) References Cited

OTHER PUBLICATIONS

"Atlas Update," video screen shots taken from https://www.youtube.com/watch?v=SD60kylclb8, Oct. 3, 2013, downloaded Aug. 14, 2023, 18 pages.

"BigDog Overview (Updated Mar. 2010)," video screen shots taken from https://www.youtube.com/watch?v=cNZPRsrwumQ, Apr. 22, 2010, downloaded Aug. 14, 2023, 25 pages.

"BigDog Reflexes," video screen shots taken from https://www.youtube.com/watch?v=3gi6Ohnp9x8, Jan. 27, 2009, downloaded Aug. 14, 2023, 15 pages.

"Petman," video screen shots taken from https://www.youtube.com/watch?v=mclbVTlYG8E, Oct. 30, 2011, downloaded Aug. 14, 2023, 12 pages.

"PETMAN Prototype," video screen shots taken from https://www.youtube.com/watch?v=67CUudkjEG4, Oct. 26, 2009, downloaded Aug. 14, 2023, 10 pages.

Boston Dynamics, "Introducing Spot Classic (previously Spot)," video screen shots taken from https://www.youtube.com/watch?v=M8YjvHYbZ9w, Feb. 9, 2015, downloaded Aug. 10, 2023, 14 pages.

Boston Dynamics, "Introducing Spot (Previously SpotMini)," video screen shots taken from https://www.youtube.com/watch?v=tf7IEVTDjng, Jun. 23, 2016, downloaded Jul. 31, 2023, 10 pages.

Boston Dynamics, "Spot Autonomous Navigation," video screen shots taken from https://www.youtube.com/watch?v=Ve9kWX_KXus, May 10, 2018, downloaded Sep. 5, 2023, 11 pages.

Boston Dynamics, "SpotMini", The Wayback Machine, http://web.archive.org/web/20171118145237/https://bostondynamics.com/spot-mini, downloaded Jul. 31, 2023, 3 pages.

Boston Dynamics, "Testing Robustness," video screen shots taken from https://www.youtube.com/watch?v=aFuA50H9uek, Feb. 20, 2018, downloaded Jul. 31, 2023, 3 pages.

Boston Dynamics, "The New Spot," video screen shots taken from https://www.youtube.com/watch?v=kgaO45SyaO4, Nov. 13, 2017, downloaded Jul. 31, 2023, 3 pages.

Redacted Presentation from IAP Event at Massachusetts Institute of Technology, Jan. 31, 2018, 10 pages.

Chinese Office Action received in Chinese Application No. 201980078255.0 dated Mar. 12, 2024 in 11 pages.

Lourenço et al., "A Volumetric Representation for Obstacle Detection in Vegetated Terrain," In 2014 IEEE International Conference on Robotics and Biomimetics (ROBIO 2014) Dec. 5, 2014 (pp. 283-290).

Video embedded in PowerPoint Presentation for IAP Event at Massachusetts Institute of Technology on Jan. 31, 2018, video screen shots taken at 1 second intervals, 47 pages.

\* cited by examiner

TERRAIN AWARE STEP PLANNING SYSTEM

CROSS REFERENCE TO RELATED APPLICATIONS

This U.S. patent application is a continuation of, and claims priority under 35 U.S.C. § 120 from U.S. patent application Ser. No. 16/288,205, filed on Feb. 28, 2019, which issued on Mar. 29, 2022 as U.S. Pat. No. 11,287,826 and claims priority under 35 U.S.C. § 119(e) to U.S. Provisional Application No. 62/744,954, filed on Oct. 12, 2018. The disclosures of these prior applications are considered part of the disclosure of this application and are hereby incorporated by reference in their entireties.

TECHNICAL FIELD

This disclosure relates to planning a sequence of steps in the presence of constraints, especially those imposed by terrain.

BACKGROUND

Robotic devices are increasingly being used in constrained or otherwise cluttered environments to perform a variety of tasks or functions. These robotic devices may need to navigate through these constrained environments without stepping on or bumping into obstacles. As these robotic devices become more prevalent, there is a need for real-time navigation and step planning that avoids contact with obstacles while maintaining balance and speed.

SUMMARY

One aspect of the disclosure provides a method for planning a sequence of steps in the presence of constraints. The method includes receiving, at data processing hardware of a robot, image data of an environment about the robot from at least one image sensor. The robot includes a body and legs. The method also includes generating, by the data processing hardware, a body-obstacle map, a ground height map, and a step-obstacle map based on the image data. The method further includes generating, by the data processing hardware, a body path for movement of the body of the robot while maneuvering in the environment based on the body-obstacle map, and generating, by the data processing hardware, a step path for the legs of the robot while maneuvering in the environment based on the body path, the body-obstacle map, the ground height map, and the step-obstacle map.

Implementations of the disclosure may include one or more of the following optional features. In some implementations, the image data includes three-dimensional point cloud data captured by a three-dimensional volumetric image sensor. The at least one image sensor may include one or more of a stereo camera, a scanning light-detection and ranging (LIDAR) sensor, or a scanning laser-detection and ranging (LADAR) sensor.

In some examples, the method includes identifying, by the data processing hardware, occupancies of space in the environment based on the image data and generating, by the data processing hardware, a three-dimensional space occupancy map based on the identification of occupancies of space in the environment. Generating the body-obstacle map, the ground height map, and the step-obstacle map based on the image data may include generating the body-obstacle map based on the three-dimensional space occupancy map, generating the ground height map based on the three-dimensional space occupancy map, and generating the step-obstacle map based on the ground height map. The ground height map identifies a height of a ground surface at each location near the robot and the step-obstacle map identifies no-step regions in the environment where the robot should not step. Optionally, generating the body-obstacle map includes generating a two-dimensional body-obstacle map based on the three-dimensional space occupancy map.

In some examples, the three-dimensional space occupancy map may include a voxel map having voxels, each voxel representing a three-dimensional space of the environment. Each voxel may be classified as either a ground surface, an obstacle, or other. Additionally, the device may include filtering, by the data processing hardware, the three-dimensional space occupancy map to generate the body-obstacle map. In some implementations, generating the body path is based on no-body regions designated in the body-obstacle map. In some examples, generating the step path is based on adjusting a nominal step pattern of a nominal gait for the robot and step constraints. The step constraints may include at least one of the following: a threshold range of a center of pressure offset for each leg in contact with a ground surface, the center of pressure offset indicating an acceptable amount of robot weight distribution for each leg at each step; whether the step path causes a leg to step into a no-step region of the step-obstacle map; whether the step path causes the body of the robot to enter a body obstacle; whether the step path causes a self-collision of the robot; or a margin of space about any no-step region of the step-obstacle map. Additionally, the step constraints may include soft constraints or hard constraints. Generating the step path for the legs of the robot, in some implementations, includes refining the generated body path.

Another aspect of the disclosure provides a robot. The robot includes a body, legs coupled to the body and configured to maneuver the robot about an environment, data processing hardware in communication with the legs, and memory hardware in communication with the data processing hardware. The memory hardware stores instructions that when executed on the data processing hardware cause the data processing hardware to perform operations. The operations include receiving image data of an environment about the robot from at least one image sensor. The operations also include generating a three-dimensional space occupancy map based on the identification of occupancies of space in the environment and a two-dimensional body-obstacle map based on the three-dimensional space occupancy map. The operations also include generating a body-obstacle map, a ground height map, and a step-obstacle map based on the image data. The operations also include generating a body path for movement of the body of the robot while maneuvering in the environment based on the body-obstacle map and generating a step path for the legs of the robot while maneuvering in the environment based on the body path, the body-obstacle map, the ground height map, and the step-obstacle map.

This aspect may include one or more of the following optional features. In some implementations, the image data includes three-dimensional point cloud data captured by a three-dimensional volumetric image sensor. In some examples, the at least one image sensor includes one or more of a stereo camera, a scanning light-detection and ranging (LIDAR) sensor, or a scanning laser-detection and ranging (LADAR) sensor.

In some examples, the operations include identifying occupancies of space in the environment based on the image data and generating a three-dimensional space occupancy map based on the identification of occupancies of space in the environment. Generating the body-obstacle map, the ground height map, and the step-obstacle map based on the image data may include generating the body-obstacle map based on the three-dimensional space occupancy map, generating the ground height map based on the three-dimensional space occupancy map, and generating the step-obstacle map based on the ground height map. The ground height map identifies a height of a ground surface at each location near the robot and the step-obstacle map identifies no-step regions in the environment where the robot should not step. Optionally, generating the body-obstacle map includes generating a two-dimensional body-obstacle map based on the three-dimensional space occupancy map.

The three-dimensional space occupancy map may include a voxel map having voxels, each voxel representing a three-dimensional space of the environment. Each voxel may be classified as either a ground surface, an obstacle, or other. The operations, in some examples, further include filtering the three-dimensional space occupancy map to generate the body-obstacle map. The body path may be based on no-body regions designated in the body-obstacle map and the step path may be based on adjusting a nominal step pattern of a nominal gait for the robot and step constraints. In some implementations, the step constraints include at least one of a threshold range of: a center of pressure offset for each leg in contact with a ground surface, the center of pressure offset indicates an acceptable amount of robot weight distribution for each leg at each step; whether the step path causes a leg to step into a no-step region of the step-obstacle map; whether the step path causes the body of the robot to enter a body obstacle; whether the step path causes a self-collision of the robot; or a margin of space about any no-step region of the step-obstacle map. The step constraints may include soft constraints or hard constraints. Generating the step path for the legs of the robot, in some implementations, includes refining the generated body path.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As legged robotic devices (also referred to as "robots") become more prevalent, there is an increasing need for the robots to navigate environments that are constrained in a number of ways. For example, a robot may need to traverse a cluttered room with large and small objects littered around on the floor. Or, as another example, a robot may need to negotiate a staircase. Typically, navigating these sort of environments has been a slow and arduous process that results in the legged robot frequently stopping, colliding with objects, and/or becoming unbalanced. Implementations herein are directed toward systems and methods for terrain and constraint planning for generating a step plan in real-time, thus allowing a legged robotic device to navigate a constrained environment quickly and efficiently while maintaining smoothness and balance.

Figure 1:
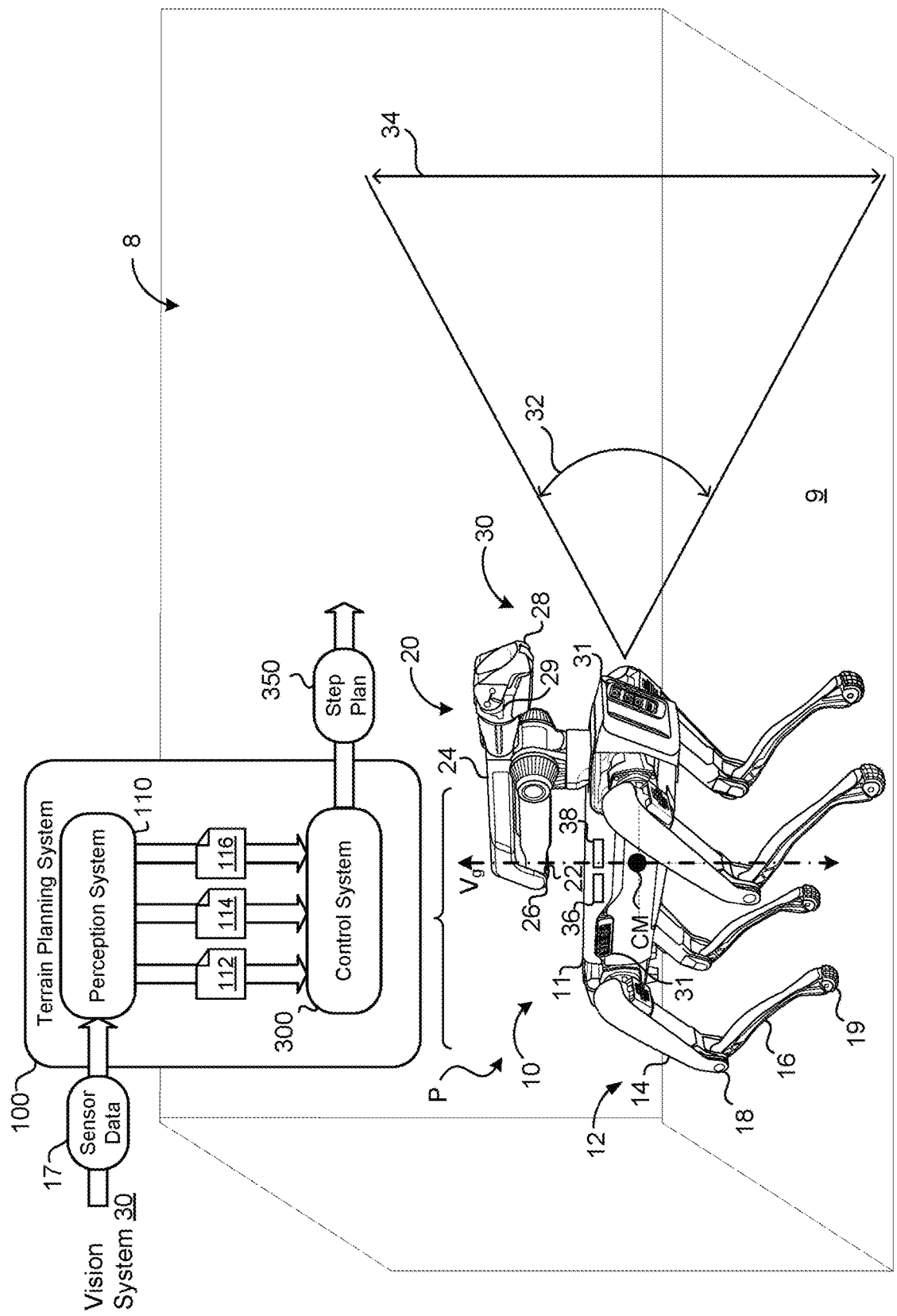
FIG. 1 is a schematic view of an example system for planning a sequence of steps in the presence of constraints.

Referring to FIG. 1, a robot or robotic device 10 includes a body 11 with two or more legs 12 and executes a step planning system 100 for enabling the robot 10 to navigate a constrained environment 8. Each leg 12 is coupled to the body 11 and may have an upper portion 14 and a lower portion 16 separated by a leg joint 18. The lower portion 16 of each leg 12 ends in a foot 19. The foot 19 of each leg is optional and the terminal end of the lower portion of one or more of the leg 12 may be coupled to a wheel. The robot 10 has a vertical gravitational axis Vg along a direction of gravity, and a center of mass CM, which is a point where the weighted relative position of the distributed mass of the robot 10 sums to zero. The robot 10 further has a pose P based on the CM relative to the vertical gravitational axis Vg (i.e., the fixed reference frame with respect to gravity) to define a particular attitude or stance assumed by the robot 10. The attitude of the robot 10 can be defined by an orientation or an angular position of the robot 10 in space. Movement by the legs 12 relative to the body 11 alters the pose P of the robot 10 (i.e., the combination of the position of the CM of the robot and the attitude or orientation of the robot 10).

In some implementations, the robot 10 further includes one or more appendages, such as an articulated arm 20 disposed on the body 11 and configured to move relative to the body 11. The articulated arm 20 may have five-degrees or more of freedom. Moreover, the articulated arm 20 may be interchangeably referred to as a manipulator arm or simply an appendage. In the example shown, the articulated arm 20 includes two portions 22, 24 rotatable relative to one another and also the body 11; however, the articulated arm 20 may include more or less portions without departing from the scope of the present disclosure. The first portion 22 may be separated from second portion 24 by an articulated arm joint 26. An end effector 28, which may be interchangeably referred to as a manipulator head 28, may be coupled to a distal end of the second portion 24 of the articulated arm 20 and may include one or more actuators 29 for gripping/grasping objects.

The robot 10 also includes a vision system 30 with at least one imaging sensor or camera 31, each sensor or camera 31 capturing image data or sensor data of the environment 8 surrounding the robot 10 with an angle of view 32 and within a field of view 34. The vision system 30 may be configured to move the field of view 34 by adjusting the angle of view 32 or by panning and/or tilting (either independently or via the robot 10) the camera 31 to move the field of view 34 in any direction. Alternatively, the vision system 30 may include multiple sensors or cameras 31 such that the vision system 30 captures a generally 360-degree field of view around the robot 10. The vision system 30 provides image data or sensor data 17 derived from image data captured by the cameras or sensors 31 to data processing hardware 36 of the robot 10. The data processing hardware 36 is in digital communication with memory hardware 38 and, in some implementations, may be a remote system. The remote system may be a single computer, multiple computers, or a distributed system (e.g., a cloud environment) having scalable/elastic computing resources and/or storage resources. A step planning system 100 of the robot 10 executes on the data processing hardware 36. In the example shown, the step planning system 100 includes a perception system 110 that receives the image or sensor data 17 from the vision system 30 and generates one or more maps 112, 114, 116 that indicate obstacles in the surrounding environment 8. The step planning system 100 also includes a control system 300 that receives the maps 112, 114, 116 generated by the perception system 110 and generates a body path or trajectory 510 (FIG. 5), and using the body path 510, generates a step path or step plan 350. Using the step plan 350, the robot 10 maneuvers through the environment 8 by following the step plan 350 by placing the feet 19 or distal ends of the leg 12 at the locations indicated by the step plan 350. In some implementations, at least a portion of the step planning system 100 executes on a remote device in communication with the robot 10. For instance, the perception system 110 may execute on a remote device to generate one or more of the maps 112, 114, 116 and the control system 300 executing on the robot 10 may receive the maps 112, 114, 116 from the remote device. Here, the control system 300 may generate the body path 510 and the step path 350. Optionally, the entire step planning system 100 may execute on a remote device and the remote device may control/instruct the robot 10 to maneuver the environment 8 based on the body path 410 and the step path 350.

Figure 2A:
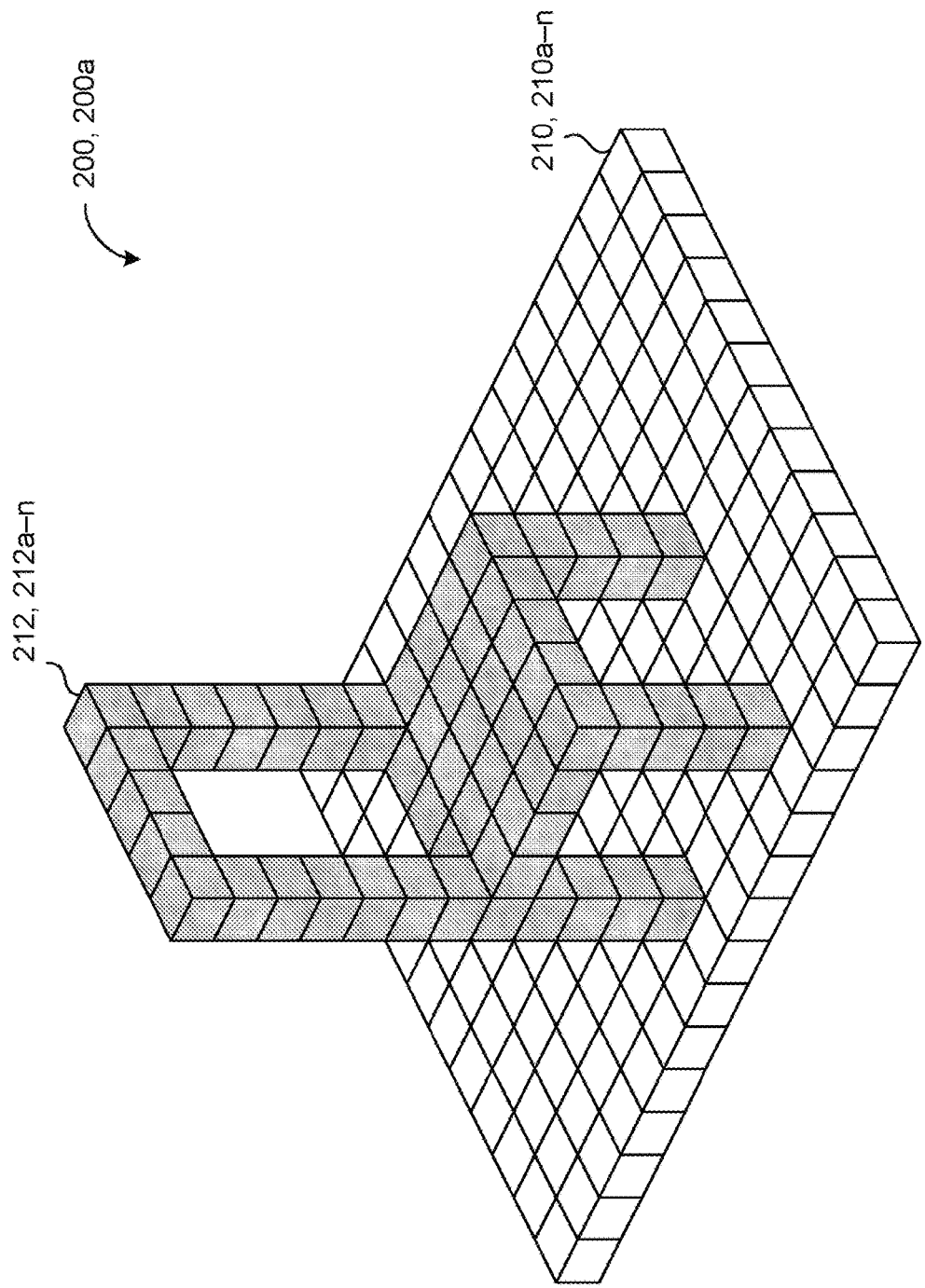
FIG. 2A is an isometric view of a volumetric three-dimensional map of voxels.

The camera(s) 31 of the vision system 30, in some implementations, include one or more stereo cameras (e.g., one or more RGBD stereo cameras). In other examples, the vision system 30 includes one or more radar sensors such as a scanning light-detection and ranging (LIDAR) sensor, or a scanning laser-detection and ranging (LADAR) sensor, a light scanner, a time-of-flight sensor, or any other three-dimensional (3D) volumetric image sensor (or any such combination of sensors). In some implementations, the vision system 30 identifies occupancies of space in the environment 8 based on the captured image or sensor data 17. The perception system 110 may use image data 17 captured by the vision system 30 to generate a 3D point cloud. The point cloud is a set of data points representing surfaces of objects in the environment 8 surrounding the robot 10. From this point cloud, the perception system 110 may generate a 3D space occupancy map 200 (FIG. 2A) based on the previously identified occupancies of space in the environment 8. In some examples, the perception system 110 generates a 3D volumetric map 200, 200a of voxels 210, 212 (FIG. 2A). Each voxel 210, 212 (i.e., cube) represents a 3D space of the environment. The size of each voxel 210, 212 is dependent upon the fidelity of the perception system 110 and the processing capabilities of the vision system 30 and data processing hardware 36. For example, the robot 10 may generate a voxel map 200 (i.e., a 3D occupancy map) of the environment 8 surrounding the robot 10 (e.g., several meters in each direction) where each voxel 210, 212 is a 3 cm cube. For each voxel, the perception system 110 may store a variety of statistics.

The perception system 110, in some implementations, classifies (using, for example, a classification algorithm, e.g., linear classifiers, decision trees, neural networks, special purpose logic, etc.) each voxel 210, 212 that contains an object as either a ground surface 9, an obstacle, or other. The perception system 110 classifies voxels 210 as a ground surface 9 when the perception system 110 determines that the robot 10 is capable of stepping on the point or space that the voxel 210, 212 represents. For example, the robot 10 may classify a sidewalk or the surface of a step as a ground surface 9. The perception system 110 classifies voxels 212 as obstacles when the perception system 110 determines that the robot 10 is not capable of stepping on the point or space represented by the voxel 210, 212. For example, the perception system 110 classifies an object that is too high for the leg of the robot to reach or an object that, if stepped on, would result in the robot 10 losing stability (i.e., balance) as an obstacle. The third classification, other, may be used for voxels 210, 212 that the robot 10 can safely disregard or ignore. For example, the perception system 110 classifies objects well above the robot 10 or objects that are far away from the robot 10 as other. FIG. 2A illustrates an example of a simple voxel map 200, 200a that includes a plane of ground surface voxels 210, 210a-n and a group of obstacle voxels 212, 212a-n (i.e., the chair).

Using the volumetric 3D map 200, which includes the classified voxels 210, 212, the perception system 110 generates a body-obstacle map 112. The body-obstacle map 112, in some implementations, represents a two-dimensional (2D) map that annotates or illustrates "keep-out areas" or "no-body regions" for the body 11 of the robot 10. That is, the body-obstacle map 112 is a 2D map that marks each location (i.e., pixel of the map 112, each pixel representative of a column of space in the environment 8 of the robot 10) as a location that is safe for the body 11 of the robot 10 to travel through or not safe for the body 11 of the robot 10 to travel through. The body-obstacle map 112 may include a grid of cells (e.g., pixels), where each cell of the grid contains a Boolean value (e.g., body may enter or body may not enter). For example, referring to FIG. 2B, view 201 shows an environment 8 that includes a staircase with railings. When the robot 10 is ascending or descending the stairs, the railings would serve as a barrier to the body 11 of the robot 10 (i.e., the railings are at a height that would come into contact with the body 11). FIG. 2C illustrates a body-obstacle map 112 that represents a 2D image of the staircase of FIG. 2B (i.e., a plan view of the staircase). In FIG. 2C, the illegal body regions (e.g., obstacle voxels) 212 (i.e., keep-out areas) represent areas that the body of the robot 10 cannot or should not enter (e.g., the staircase railings, walls, large obstacles, etc.).

Figure 2D:
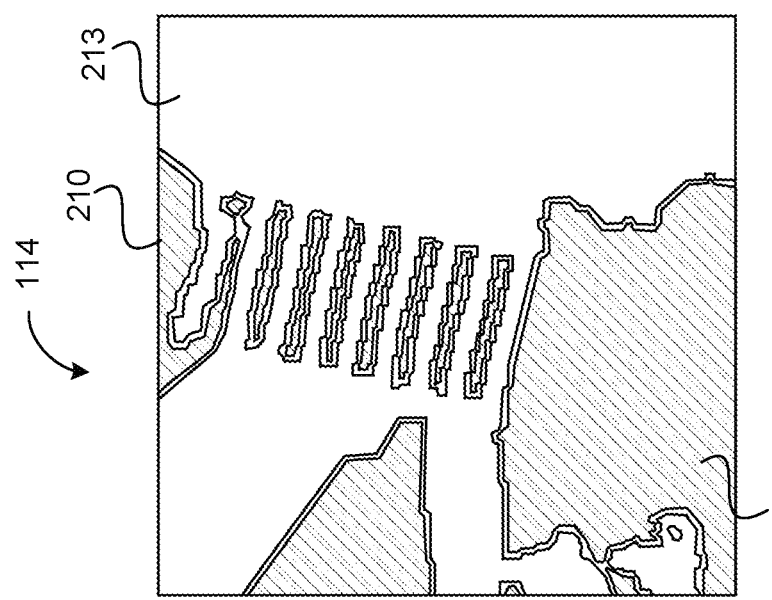
FIG. 2D is an example no-step map of the environment of FIG. 2A.
Figure 2C:
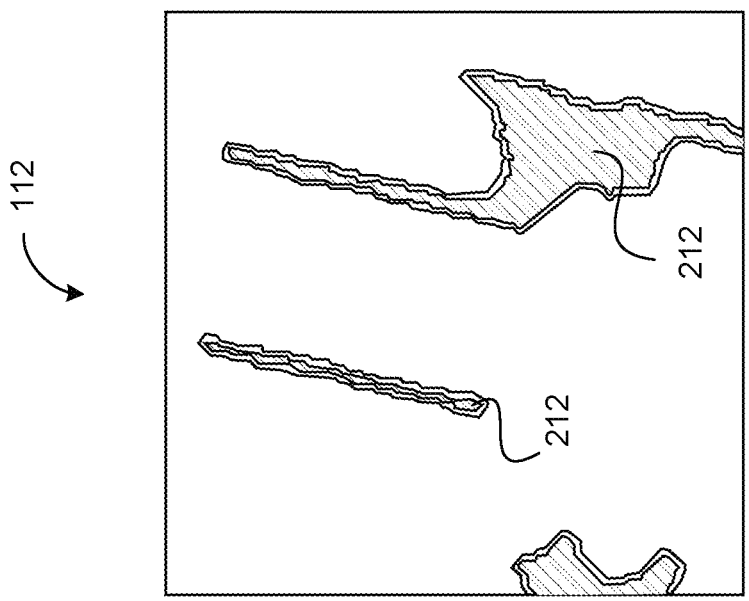
FIG. 2C is an example body-obstacle map of the environment of FIG. 2A.

Referring to FIGS. 1 and 2D, the perception system 110 also uses the volumetric 3D map 200 (or the ground height map 116, as discussed in more detail below) to generate a step-obstacle map 114. The step-obstacle map 114, in some examples, represents a 2D plan view map that illustrates keep-out or "no-step" regions 213 for steps by the legs 12 of the robot 10. That is, the step-obstacle map 114 is similar to the body-obstacle map 112, however, the keep-out areas 213 instead represent areas that steps (i.e., the feet 19 or distal ends of the legs 12) of the robot 10 should not "touch down" at. That is, while the feet 19 or distal ends of the legs 12 may pass over the keep-out regions 213, the feet 19 may not complete a step within the region 213. The step-obstacle map 114 may include a grid of cells (e.g., pixels), where each cell of the grid contains a Boolean value (e.g., step or no-step).

Different considerations may be used to generate the step-obstacle map 114 versus the body-obstacle map 112 which may lead to some obstacles being classified as a body obstacle, a step obstacle, a body and step obstacle, or neither. For example, the legs 12 of the robot 10 support the body 11 a distance above the ground surface 9, and therefore the body 11 may safely avoid obstacles that are near the ground surface 9. The step-obstacle map 114 may also take into consideration aspects such as how high the robot 10 is capable of stepping via the legs 12. Further, in some examples, knees of the robot 10 (i.e., leg joints 18), may extend out in front or behind the feet 19, thereby limiting where the feet 19 may be placed (e.g., the knees may bump into a sufficiently tall obstacle before a foot 19 can be raised and placed on the obstacle). Accordingly, a keep-out areas 213 could include an area upon the ground surface 9 that is otherwise devoid of obstacles, but due to the geometry and pose of the robot 10, traversal of the robot 10 into the keep-out area 213 could cause the body 11 of the robot 10 to contact an obstacle above the ground surface 9.

Generally, obstacles classified as body obstacles are also classified as step obstacles, but the reverse need not be true, as step obstacles may not be classified as body obstacles (e.g., an obstacle high enough to cause problems in stepping, but low enough that the body 11 of the robot 10 would not come in contact with the obstacle). In some situations, body obstacles may not be classified as step obstacles. For example, a table may be a body obstacle, but the robot 10 may step beneath the table. The perception system 110 may classify body obstacles as a larger step obstacle as it may be infeasible to place a foot directly next to a body obstacle (i.e., enlarge the size of the body obstacle).

In some implementations, the perception system 110 classifies large areas of step obstacles as a body obstacle. For example, if an area of the environment 8 contains a particularly dense number of step obstacles such that traversing the area will be difficult, the perception system 110 may classify the entire area as a body obstacle despite the obstacles not being a height to impact the body of the robot 10 in order obtain a better final step plan 350 (as discussed in more detail below). The perception system 110, in some implementations, classifies areas as body obstacles to ensure the robot 10 does not enter a certain area for reasons other than colliding with objects. For example, a user may desire to direct the robot 10 in a certain direction or along a certain path.

Figure 2B:
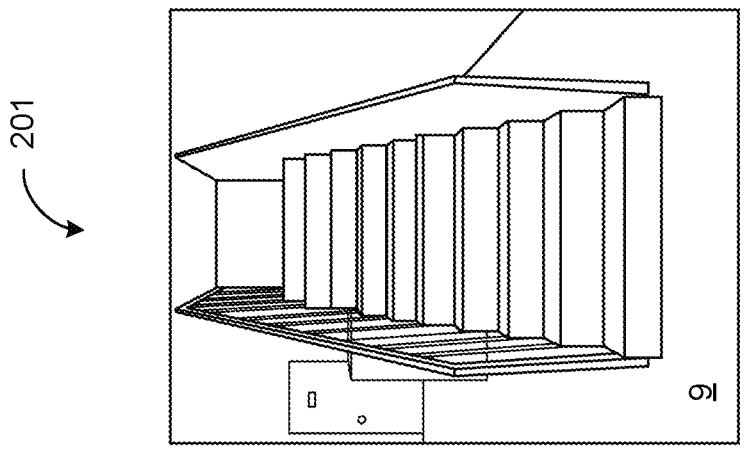
FIG. 2B is a perspective view of an environment including a staircase.

The step-obstacle map 114 of FIG. 2D is representative of the staircase of FIG. 2B. As with the body-obstacle map 112 of FIG. 2C, the step-obstacle map 114 outlines the areas 213 the perception system 110 determines are not safe or valid for the robot 10 to step and areas 210 that are safe or valid. For example, the ground surface 9 in front of the stair case and each individual step are marked as valid in the step-obstacle map 114.

Referring back to FIG. 1, in some implementations, the perception system 110 also generates a ground height map 116 from the 3D volumetric map 200. The ground height map 116 identifies a height of a ground surface 9 at each location near the robot 10. That is, the ground height map 116, similar to a topographical map, is a 2D map that notes the height of the ground surface 9 at each location in a horizontal plane with respect to a reference point or height. The ground height map 116, in some examples, only illustrates the height of the ground surface 9, and not any surface above the ground surface 9. That is, the ground height map 116 may label the height of the ground surface 9 underneath a table, and not the height of the surface of the table. The ground height map 116 may be used to help generate the step-obstacle map 114 (e.g., determining when the ground surface is too high or too steep to safely traverse and therefore should be marked as a step obstacle). The perception system 110 generates the ground height map 116, for example, by determining a height of the voxel 210 classified as ground surface 9 in each column of the 3D map. The step-obstacle map 114 may in turn be generated from the ground height map 116. The perception system, optionally, processes both the body-obstacle map 112 and the step-obstacle map 114 into signed distance fields (i.e., using signed distance functions).

Figure 3:
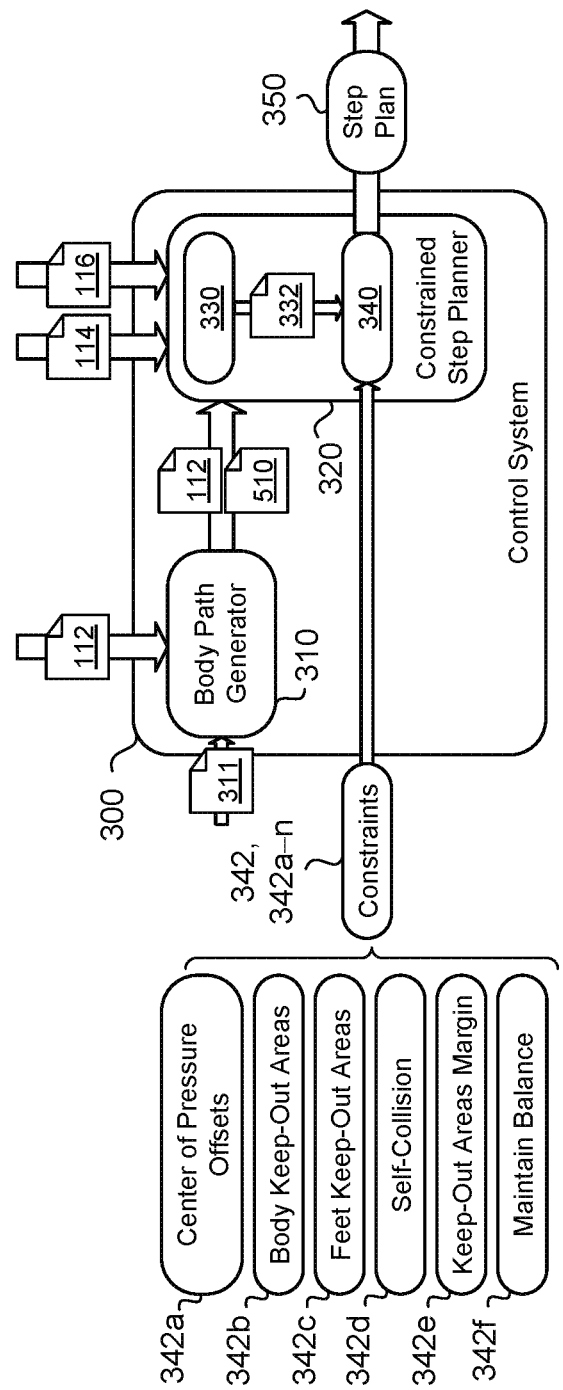
FIG. 3 is a schematic view of example components of a control system of the system of FIG. 1.

Referring now to FIG. 3, the control system 300 of the step planning system 100 receives the maps (the body-obstacle map 112, the step-obstacle map 114, and the ground height map 116) from the perception system 110 and generates the step plan 350 for use by the robot 10 to navigate the environment 8 (i.e., a map of locations for the robot 10 to place feet 19). The control system 300, in some implementations, includes a body path generator 310 and a constrained step planner 320.

The body path generator 310 receives the body-obstacle map 112 from the perception system 110 and a position 311 that the robot 10 is to navigate to (i.e., where the robot 10 intends to go). The body path generates 310 then generates a body trajectory 510 (i.e., a path for the body 11 of the robot 10 to follow) that avoids body obstacles 520 (FIG. 5) annotated in the body-obstacle map 112 (FIG. 5) while the robot 10 maneuvers in the environment 8. The body path generator 310 generates the body trajectory or body path 510 with a method or algorithm that is not resource intensive (e.g., a potential field method, a rapidly-exploring random tree, and/or a trajectory optimizer). For example, using the potential field method, a simplified model of the body 11 is used (e.g., momentum is not accounted for, and plans velocity only accounting for positions) to quickly generate a planar trajectory that represents an approximate path 510 for the robot 10 to traverse. The planar trajectory may include horizontal motion of the CM and yaw of the robot 10. While not necessarily optimal, the body trajectory 510 quickly provides a good approximation of a path that provides an ideal starting point for further path optimization. Notably, the control system 300 generates the body trajectory 510 without use of the step-obstacle map 114, and therefore the body path 510 does not provide for where the robot 10 should step when following the body trajectory 510.

Figure 6:
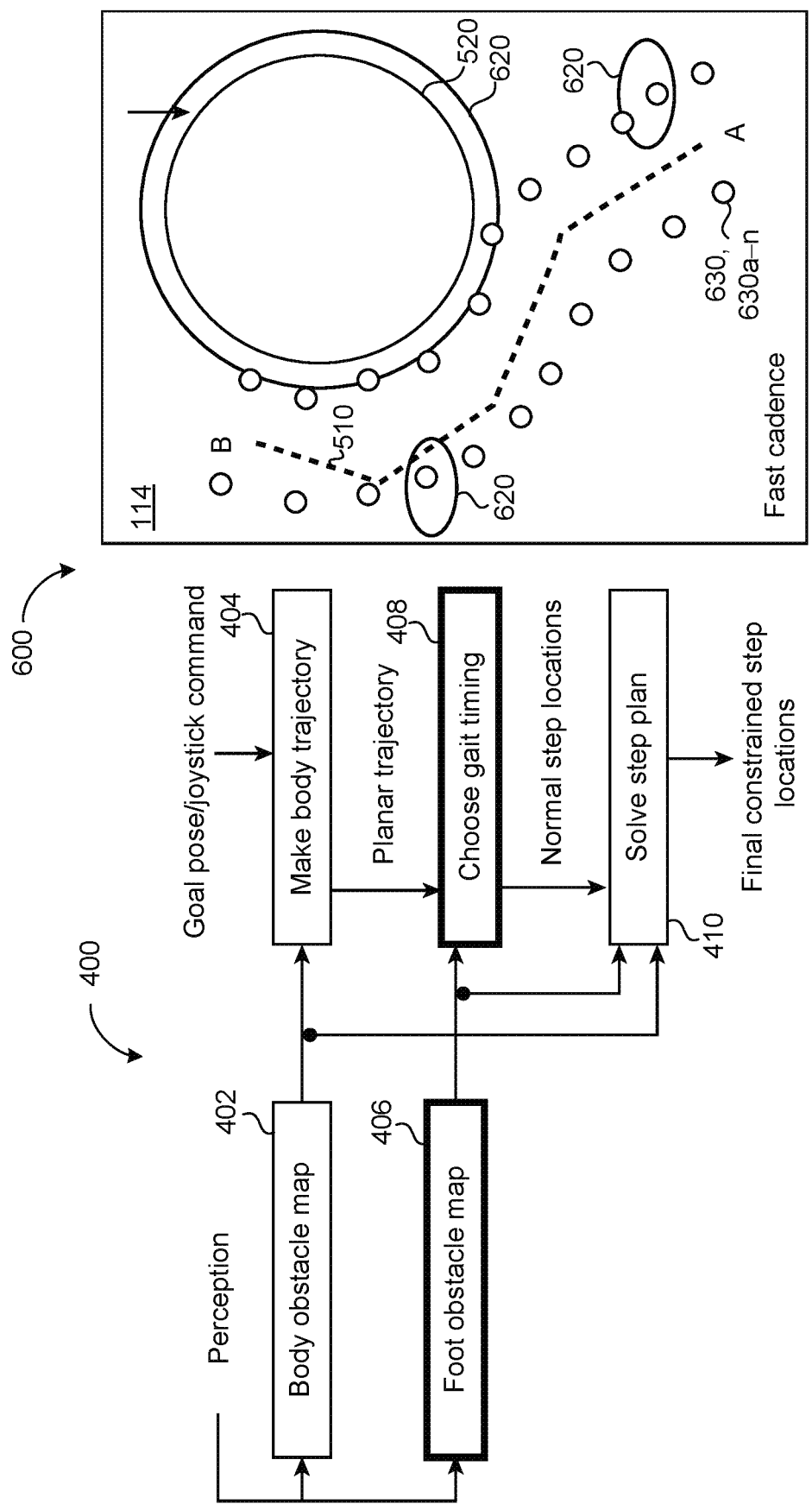
FIG. 6 is a schematic view of step locations associated with a fast cadence for following a body path overlaid on an example no-step map.

With continued reference to FIG. 3, the constrained step planner 320 receives the body trajectory 510 from the body path generator 310 as a starting point for generating the final constrained step locations (e.g., step plan) 350. In some examples, the constrained step planner 320 includes a gait determiner 330 that first determines a gait timing 332 that provides nominal step locations for of the robot 10. That is, the gait determiner 330 determines which gait (e.g., a slow walk, a fast walk, a trot, etc.) provides the most optimal step locations with respect to step obstacles 620 (FIG. 6) presented in the step-obstacle map 114 (FIG. 6). The gait determiner 330, optionally, is separate from the constrained step planner 320. The gait determiner 330, in some implementations, provides the determined gait timing 332 to a step solver 340. As described in more detail below, the step solver 340 accepts the gait timing 332 and one or more constraints 342, 342a-n. The step solver 340 applies the constraints 342 to the nominal step locations of the determined gait timing 332 and solves for an optimized step plan 350. As described in more detail below, the constraints 342, in some implementations, 342 include a center of pressure (CoP) offset constraint 342a, a body keep-out constraint 342b, a step keep-out constraint 342c, a self-collision constraint 342d, a keep-out margin constraint 342e, and a balance constraint 342f. The constraints 342 may include one or more other constraints in addition to, or in lieu of, one or more of the constraints 342a-342f.

The constrained step planner 320, in some implementations, receives a variety of other information. For example, the constrained step planner 320 may receive the current position and velocity of the CM of the robot 10, feet touchdown and liftoff information (e.g., timing), and swing foot position and/or velocity. The constrained step planner 320 may also receive the body-obstacle map 112. The constrained step planner 320, in some implementations, adjusts or refines the body path trajectory 510. The adjustment may be minor. For example, the constrained step planner 320 may account for swaying of the body 11 while stepping through the environment 8 (which is not accounted for in the simplified body path trajectory 510). In some cases, the adjustment may be major. For example, the simplified body trajectory 510 might be physically impossible (e.g., include infinite accelerations) or might be difficult to solve for once the gait timing 332 is determined. The constrained step planner 320, in some implementations, only adjusts translation and not yaw trajectory of the body 11 of the robot 10, and in other implementations, adjusts both the translation and the yaw of the body 11.

Figure 4:
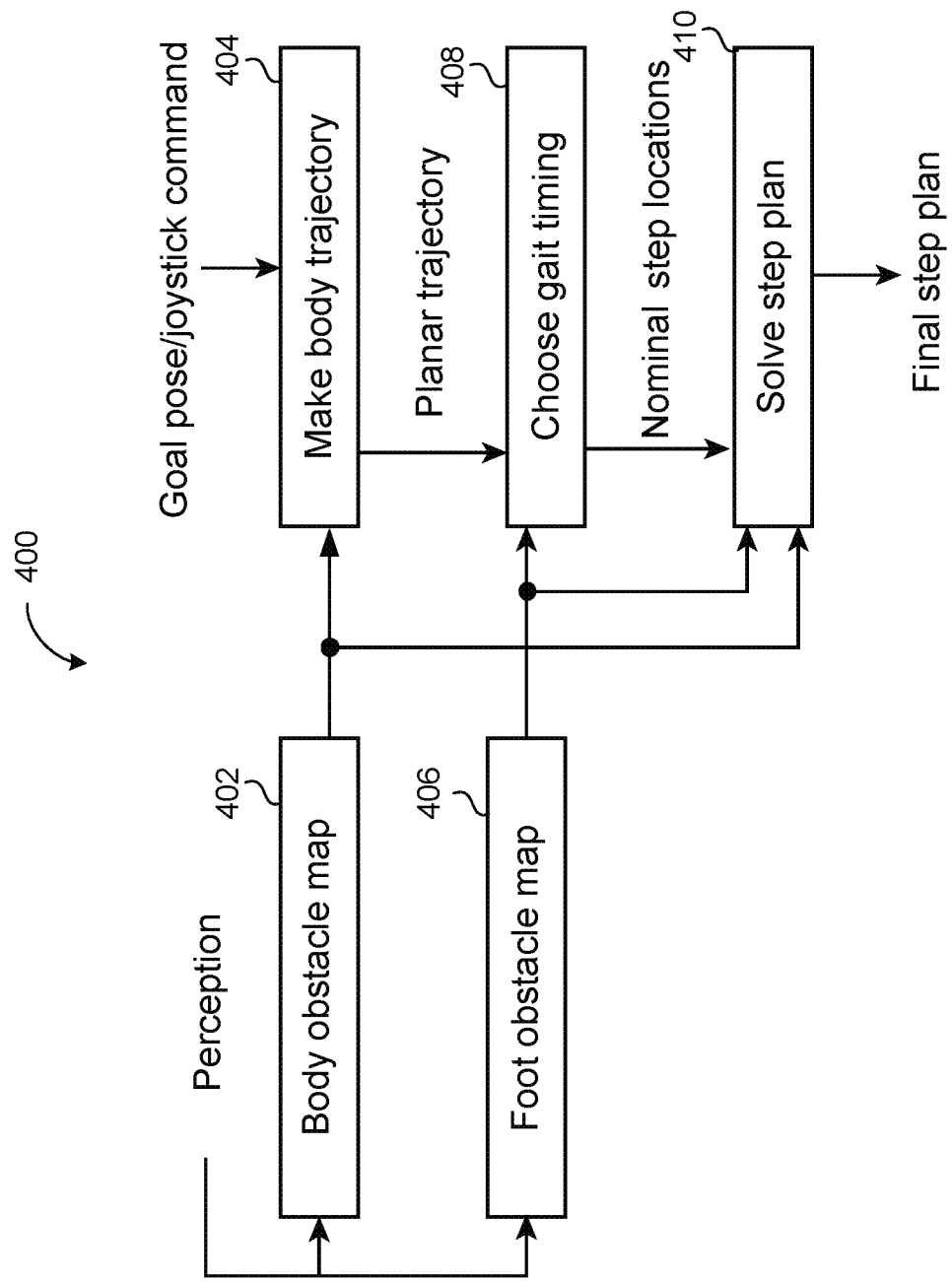
FIG. 4 is a flowchart of an example method for generating a final step plan.

FIG. 4 illustrates an example flowchart 400 depicting a process flow for the step planning system 100. At step 402, the perception system 110 creates the body-obstacle map 112, and at step 404, the control system 300 uses the body-obstacle map 112 to generate a body trajectory or body path 510. The perception system 110 also creates a step-obstacle map 114 at step 406, and at step 408, the control system 300, via the gait determiner 330 of the constrained step planner 320, uses the planar body path 510 and the step-obstacle map 114 to select a gait timing 332. At 410, the step solver 340 of the constrained step planner 320 uses the chosen gait timing 332, the body-obstacle map 112, and the step-obstacle map 114 to solve for the final step plan 350 (i.e., locations for the robot 10 to place its feet 19).

Figure 5:
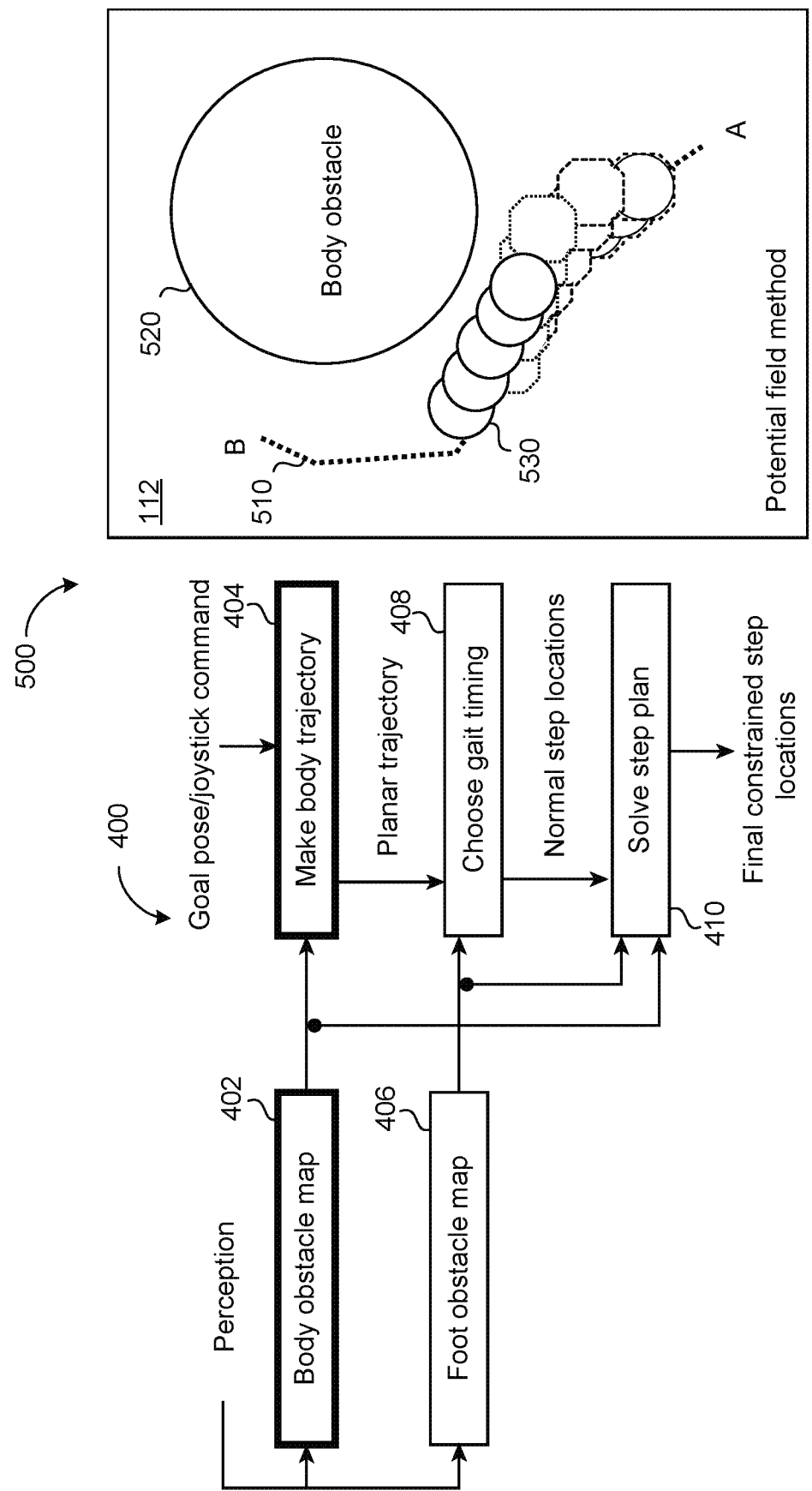
FIG. 5 is schematic view of an example body path overlaid on an example body-obstacle map.

FIG. 5 shows a schematic view 500 depicting a body path 510 for navigating around body obstacles 520. For instance, flowchart 400 depicts the control system 300 using the body-obstacle map 112 generated at step 402 to generate the body path 510 at step 404. Using, for example, a potential field method, the body path generator 310 of the control system 300 plots a body path 510 from point A to point B to navigate around one or more body obstacles 520. The body obstacles 520 may also be referred to as body-obstacle zones 520 in which the body 11 of the robot 10 would contact one or more obstacles if the body 11 crosses/enters into the body-obstacle zone 520. That is, the area defined by the body-obstacle zone 520 is not indicative of a body obstacle in and of itself, but rather, is indicative of an area the body 11 of the robot 10 is not permitted to enter, because the body 11 would come into contact with one or more obstacles. The body path generator 310 ensures the validity of the body path 510 by generating a simulated body 530 of the robot 10 travelling along the path 510. A valid path results, for example, when the simulated body 530 does not contact any of the body-obstacle zones 520.

Figure 7:
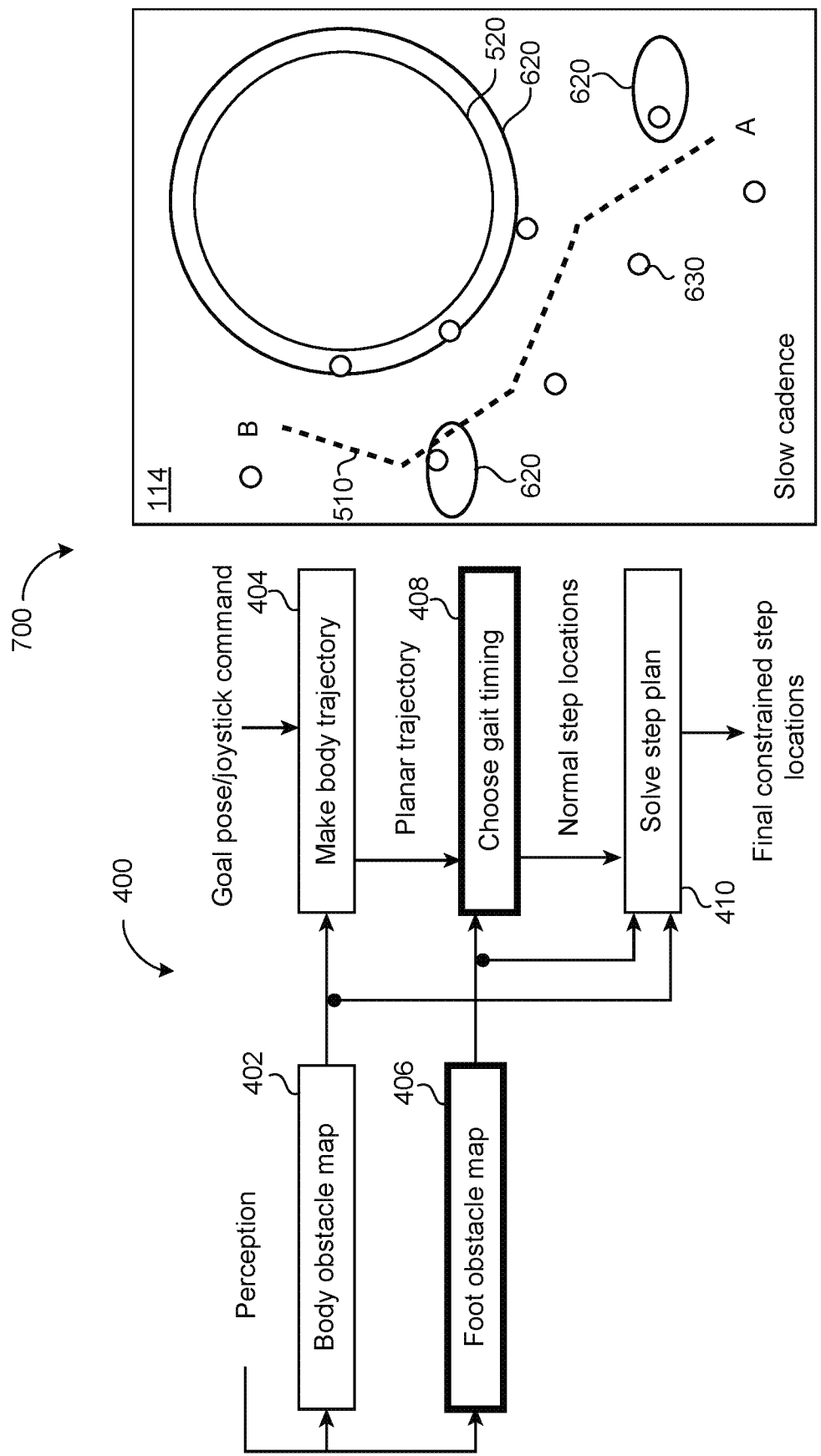
FIG. 7 is a schematic view of step locations associated with a slow cadence overlaid on an example no-step map.
Figure 8:
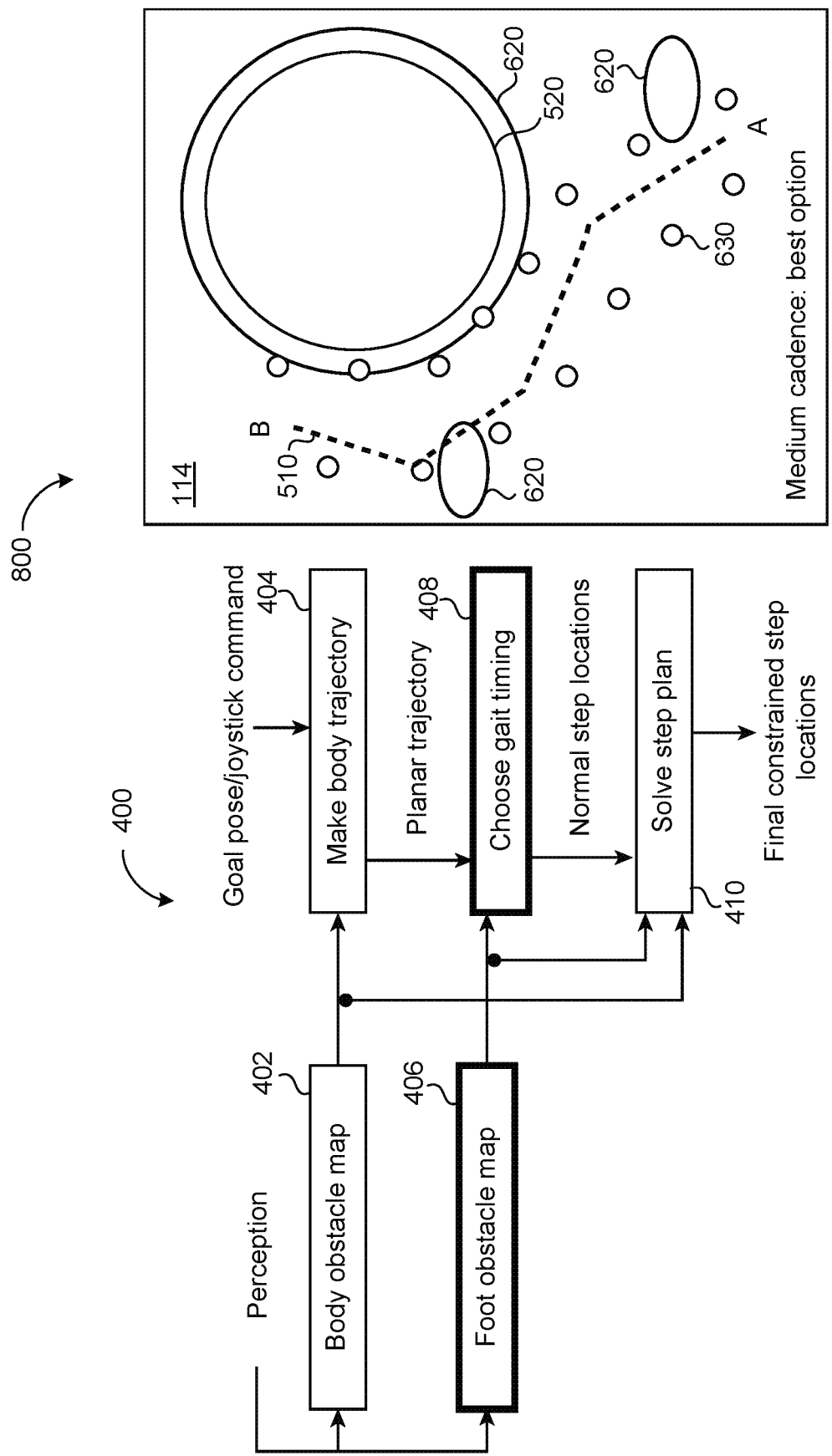
FIG. 8 is a schematic view of step locations associated with a medium cadence overlaid on an example no-step map.

As previously discussed, after receiving the step-obstacle map 114 from the perception system 110, the gait determiner selects a gait to generate nominal step locations. Referring now to FIGS. 6-8, the gait determiner 330 of the constrained step planner 320, in some implementations, analyzes a number of potential gaits to find optimal nominal step locations. FIG. 6 shows a schematic view 600 depicting step locations 630 associated with a fast cadence for following the body path 510 plotted on the step-obstacle map 114. For instance, flowchart 400 depicts the control system 300, via the gait determiner 330 of the constrained step planner 320, using the planar body path 510 generated at step 404 and the step-obstacle map 114 generated at step 406 to select a gait timing 332 having a fast cadence for the step location 630 at step 408. As used herein, the terms "feet location(s)", "foot location(s)", and "step location(s)" are used interchangeably.

The gait determiner 330 begins with the body path 510 plotted on step-obstacle map 114 and overlays the selected cadence (i.e., where the robot 10 would step if the body 11 were to follow the body path 510 and the legs 12 moved at the selected cadence). In the example shown, the body path 510 may intersect with one or more step obstacles 620, but not with body obstacles 520 (which is ensured previously by the body path generator 310). Each step location 630, 630a-n is plotted and evaluated. In some implementations, the gait determiner 330 generates a score that reflects a quality of the step locations 630 of the currently simulated gait timing. The score for the fast cadence of FIG. 6 may be relatively low due to the number of minor collisions between step locations 630 and step obstacles 620 (e.g., the locations where step locations 630 overlap step obstacles 620). The score may be affected by the number of collisions with step obstacles 620 and by the severity of the collisions. The gait determiner 330 may emphasize a distance the step locations 630 must be shifted to avoid obstacles 620. For example, step locations 630 that slightly collide with three obstacles 620 may be preferable to step locations 630 that severely collide with a single obstacle 620.

FIG. 7 shows a schematic view 700 depicting step locations 630 associated with a slow cadence for following the body path 510 plotted on the step-obstacle map 114. Similar to the step locations 630 associated with the fast cadence of FIG. 6, the slow cadence of FIG. 7 exhibits multiple step locations 630 within or contacting step obstacles 620 leading to a non-ideal score. On the other hand, the schematic view 800 of FIG. 8 depicts the step locations 630 now associated with a medium cadence (i.e., slower than the fast cadence of FIG. 6 but faster than the slow cadence of FIG. 7) for following the body path 510 plotted on the step-obstacle map 114. The medium cadence has the lowest number of collisions between step locations 630 and step obstacles 620, and therefore may receive the highest score out of the slow, medium, and fast cadences. While only three cadences are exemplified, it is understood that the gait determiner 330 may evaluate any number of gait timings before selecting a specific cadence. The score assigned to each analyzed gait timing may reflect the amount of optimization required to meet given constraints. The more constraints that the nominal step locations 630 violate (e.g., colliding with step obstacles 620), the more optimization may be required. In addition to the step obstacle and body obstacle constraints, the score may reflect other constraints (e.g., a speed constraint). For example, a slower cadence may be weighted more than a fast cadence for some tasks or environments.

Figure 9:
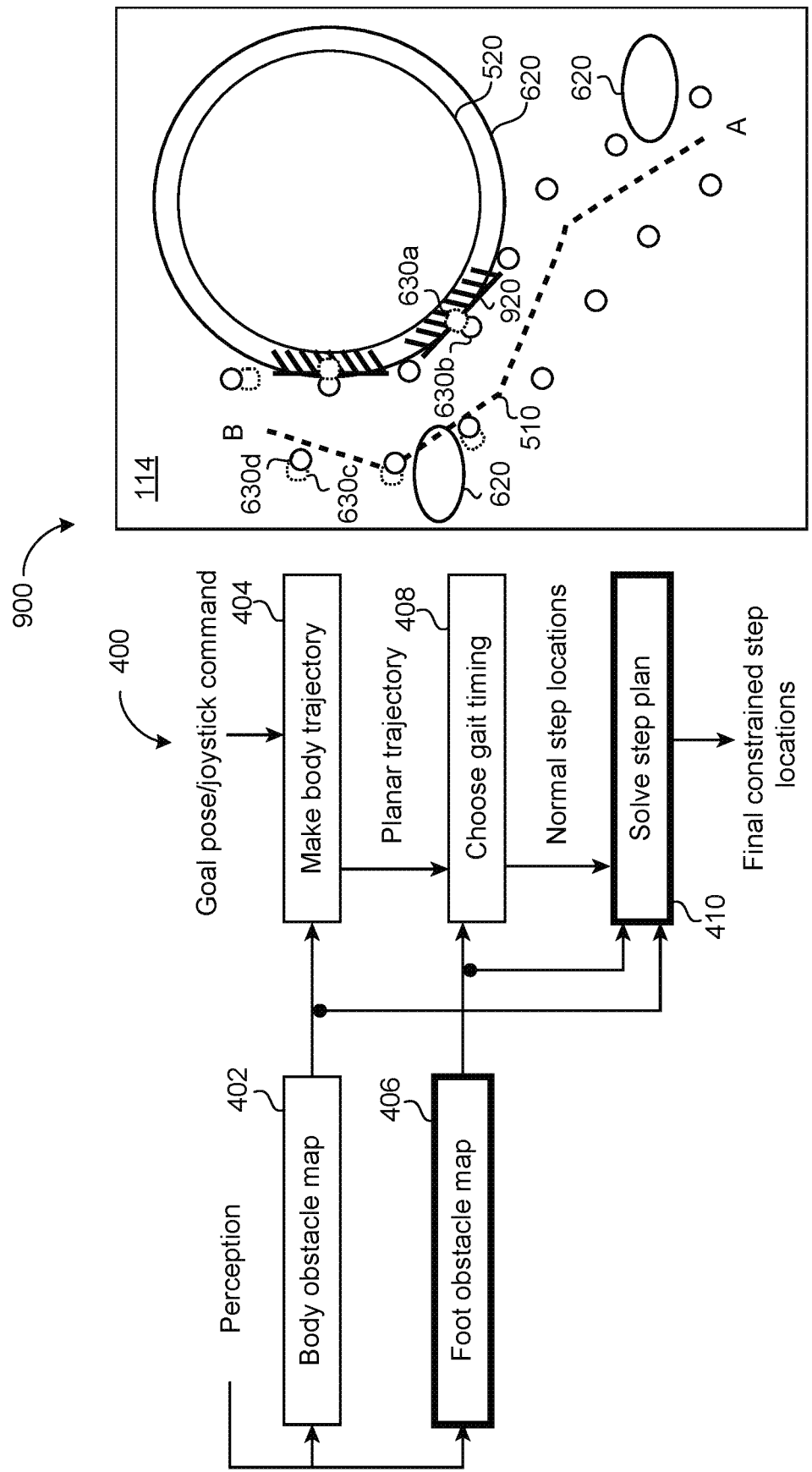
FIG. 9 is a final step plan for step locations associated with a selected gait overlaid on an example no-step map.

Referring now to FIG. 9, once the gait determiner selects a gait timing 332 and nominal step locations 630, the step solver 340 of the constrained step planner 320 solves for the final step plan 350 (e.g., step 410 of the flowchart 400). FIG. 9 shows a schematic view 900 depicting the final step locations 630 associated with the selected gait timing 332 (e.g., cadence) for following the body path 510 plotted on the obstacle map 114. The step solver 340 accepts a number of constraints 342 (i.e., variables) that the step solver 340 considers while solving. In some examples, each constraint 342 is a "hard" constraint or a "soft" constraint. A hard constraint is a constraint 342 that the step solver 340 cannot violate and still have a successful step plan 350. For example, avoiding a step obstacle 620 (e.g., the edge of a drop off) may be labeled as a hard constraint, as stepping on the specific step obstacle 620 may lead to catastrophic results (e.g., falling off an edge). A soft constraint is a constraint 342 that the step solver 340 will attempt to meet, but may violate if necessary to achieve a successful step plan 350. For example, the step solver 340 may have a constraint 342 to not come within a threshold distance of a step obstacle 620 (i.e., a "margin" constraint 342e). While maintaining the threshold distance is ideal, the step solver 340 may, if necessary, intrude into the boundary (e.g., to ensure compliance with a hard constraint). Soft constraints may be weighted. That is, each constraint 342 may be given a specific weight or "softness" that allows the step solver 340 to determine which constraint to violate first if all constraints cannot be met. For example, if the step solver 340 has a margin constraint 342e and a balance constraint 342f (i.e., a requirement to maintain the balance of the robot 10), the balance constraint 342f may be weighted more (e.g., be "harder") than the margin constraint 342e, as it may be more important to maintain balance than to maintain the margin from the step obstacle 620. Thus, the step solver 340 may choose to violate the margin constraint 342e first or to a greater degree than the balance constraint 342f.

A constraint 342 may be a (hard or soft) equality constraint (e.g., x=5) or an inequality constraint (e.g., x<=5). The step solver 340, in some implementations, also strives to minimize costs while obeying (or attempting to obey) constraints 342. A cost may be equivalent to a soft equality constraint. That is, in some instances, a soft constraint may be considered a cost to be minimized by the solver 340. Some constraints (e.g., the balance constraint 342f) may be treated as a cost or a soft constraint. For example, if in the absence of a constraint where x is greater than 5, adding an example cost and an example inequality constraint will have the same effect (assuming equivalent weighting). However, if in the absence of the constraint, x is less than 5, adding the cost (or equality constraint) will cause x to become closer to 5, but the inequality constraint will have no effect. In some implementations, the step solver 340 uses costs and soft inequality constraints and does not use hard constraints or equality constraints.

The step solver 340 may solve for any number of constraints 342. As previously discussed (FIG. 3), the step solver 340 may have constraints 342b, 342c to keep out of step/body obstacle areas, a margin constraint 342e to keep a threshold distance from step obstacles 620, and a balance constraint 342f to maintain balance and/or stability. In other examples, the step solver 340 may receive a center of pressure offset constraint 342a that includes a threshold range of a center of pressure offset for the leg(s) 12 in contact with the ground 9. The center of pressure offset may indicate an acceptable amount of robot 10 weight distribution for each leg 12 at each step (i.e., the weight distribution between legs(s) 12 in contact with the ground 9). That is, the center of pressure offset constraint 342a ensures that the percentage of the weight of the robot 10 applied to a step of the robot is valid. For example, when two feet are in contact with the ground surface 9, the step solver 340 may be constrained to not apply a vertical force of 120% (e.g., 20% more than the entire weight of the robot 10) to a first foot and −20% to a second foot, as such a feat is impossible. In another example, the step solver 340 may receive a self-collision constraint 342d. That is, a constraint 342d to ensure that the step solver 340 attempts to not collide the robot 10 with itself (i.e., place a first foot 19 where a second foot 19 is already located). The constraints 342 may be predetermined prior to navigation. The constraints 342 may also be modified, added, or removed during navigation. In some examples, the constraints 342 are received from a source external to the control system (e.g., a user or manufacturer of the robot 10), while in other examples, the step planning system 100 generates the constraints 342 autonomously based on data received from sensors of the robot 10.

In an attempt to meet the constraints 342 assigned to the step solver 340, the step solver 340 may adjust each step location 630. With continued reference to FIG. 9, the step obstacle avoidance constraint 342c may "shove" or otherwise adjust step locations 630 away from the obstacle. For instance, the step location 630a is moved, for example, to step location 630b because of the keep out boundary 620 (which is generated in response to keep-out constraint 342c). When the step solver 340 modifies the location of a step location 630 from the original nominal step location, the adjustment may cascade or ripple into changes for other step locations 630. For example, as exemplified in FIG. 9, step location 630c may be moved to step location 630d in response to the step solver 340 previously adjusting step location 630a in order to maintain balance as the robot 10 moves along the body trajectory 510. When the step solver 340 completes the final constrained step location plan 350, the robot 10 may then commence travel, placing its feet with respect to the determined step locations 630. During travel, the robot 10 may continuously rerun or regenerate the step plan 350 based on the most recent maps 112, 114, 116 received from the perception system 110 (with the same or updated constraints 342) and in response adapt or alter the step plan 350 as appropriate.

Ideally, the step solver 340 uses quadratic programming so that the step solver 340 may solve the step plan 350 in real-time. A quadratic program uses linear constraints to quickly solve an optimization problem. That is, the step solver 340, in some examples, minimizes or maximizes a quadratic function of several variables that are linearly constrained. Still referring to FIG. 9, in order to linearly constrain obstacle regions of amorphous shapes, the step solver 340 may draw a series of straight lines 920 to closely approximate the shape of the obstacle. In some examples, the step solver 340 only applies the linear constraints to relevant portions of the obstacle. In other examples, the step solver 340 originally solves for a step plan 350 without any constraints 342, and then iteratively adds constraints 342 and regenerates interim step plans until the step solver 340 achieves an optimized final step plan 350.

The step solver 340 may begin by solving convex constraints. The solver 340 may then use the solution from the convex constraints to iteratively determine the best linear approximation of non-convex constraints. For example, based on current position and velocity of a swinging foot 19, a known time until the touchdown (i.e., between the foot 19 and the ground 9), and a maximum acceleration of the foot 19, the solver 340 may determine a rectangular-shaped region where the foot 19 may touchdown. Similarly, other shapes may approximate other regions. For example, because each leg 12 has a maximum length, foot 19 touchdown may not occur too far from the hip. This area may be represented as an octagon. Foot 19 liftoff may be approximated similarly to foot 19 touchdown, but may instead use a rectangle (as opposed to the octagon). Stance legs 12 may have a trapezoidal boundary to protect against self-collision.

Thus, the step planning system 100 of the robot 10 decouples approximating and determining a body path 510 from determining a precise step plan 350. By first quickly approximating a body trajectory 510, the control system 300 generates a reasonable first-pass solution that may be used to quickly optimize the precise final step plan 350 that would otherwise be computationally inefficient. Because of this, the step plan 350 may be regenerated at a high frequency (e.g., 300 Hz) to enable real-time navigation while the robot 10 maneuvers in the environment 8. The perception system 110 may operate at a different frequency than the control system. That is, new maps may be provided to the control system 300 at a rate that is different (e.g., slower) than the rate at which the control system 300 determines a step plan 350. The high frequency of regeneration by the control system 300 allows the robot 10 to quickly adapt to new perception data (e.g., a new detected object), to quickly react to surprising dynamics (e.g., maintaining balance after getting pushed or bumped), or to respond to new requirements (e.g., increase or decrease speed).

Figure 10:
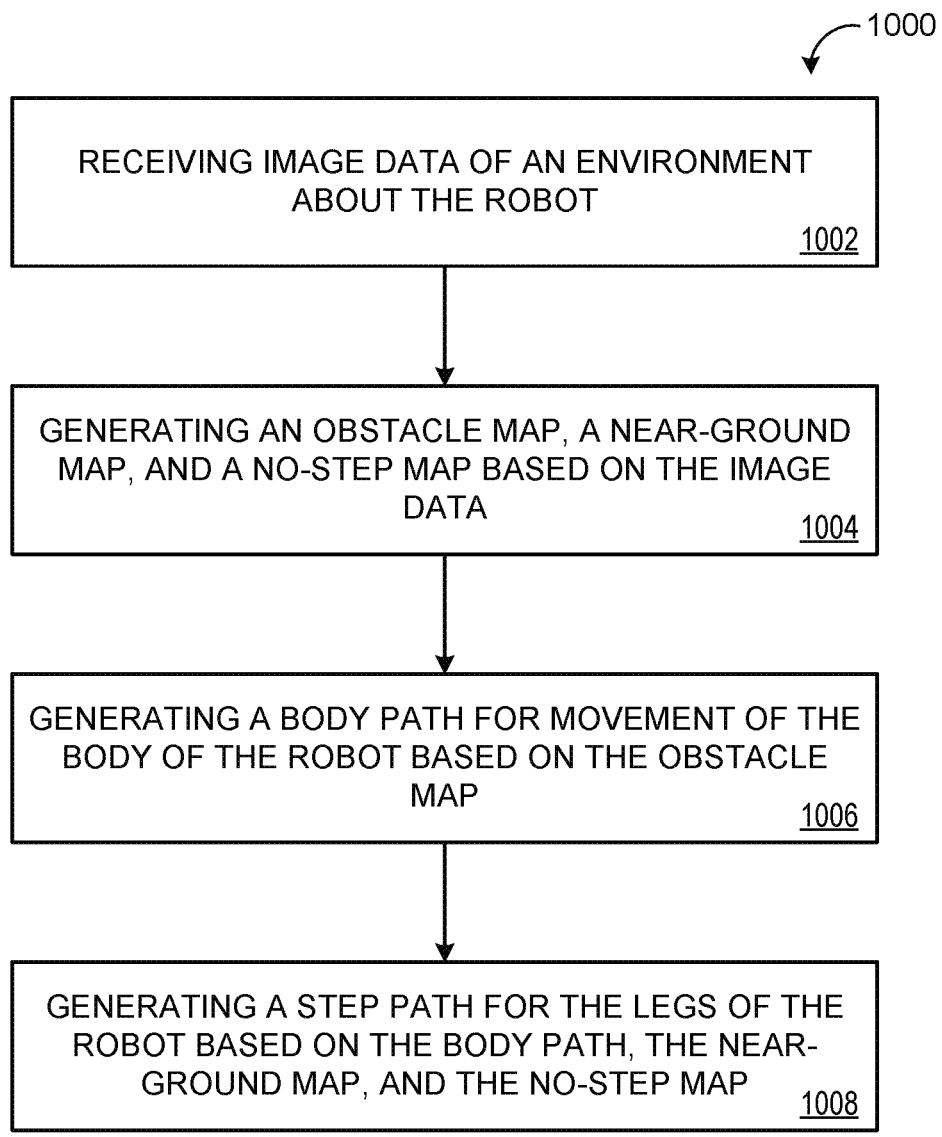
FIG. 10 is a flowchart of an example method for terrain and constraint planning for a step plan.

FIG. 10 is a flowchart of an example method 1000 for terrain and constraint planning a step plan. The flowchart starts at operation 1002 by receiving, at data processing hardware 36 of a robot 10, image data 17 of an environment 8 about the robot 10 from at least one image sensor 31. The image sensor 31 may include one or more of a stereo camera, a scanning light-detection and ranging (LIDAR) sensor, or a scanning laser-detection and ranging (LADAR) sensor. In some implementations, the image data 17 includes three-dimensional point cloud data captured by a three-dimensional volumetric image sensor. The robot 10 includes a body 11 and legs 12. At step 1004, the method 1000 includes generating, by the data processing hardware 36, a body-obstacle map 112, a step-obstacle map 114, and a ground height map 116 based on the image data 17.

At step 1006, the method 1000 includes generating, by the data processing hardware 36, a body path 510 for movement of the body 11 of the robot 10 while maneuvering in the environment 8 based on the body-obstacle map 112. At step 1008, the method 1000 includes generating, by the data processing hardware 36, a step path 350 for the legs 12 of the robot 10 while maneuvering in the environment 8 based on the body path 510, the body-obstacle map 112, the step-obstacle map 114, and the ground height map 116.

Figure 11:
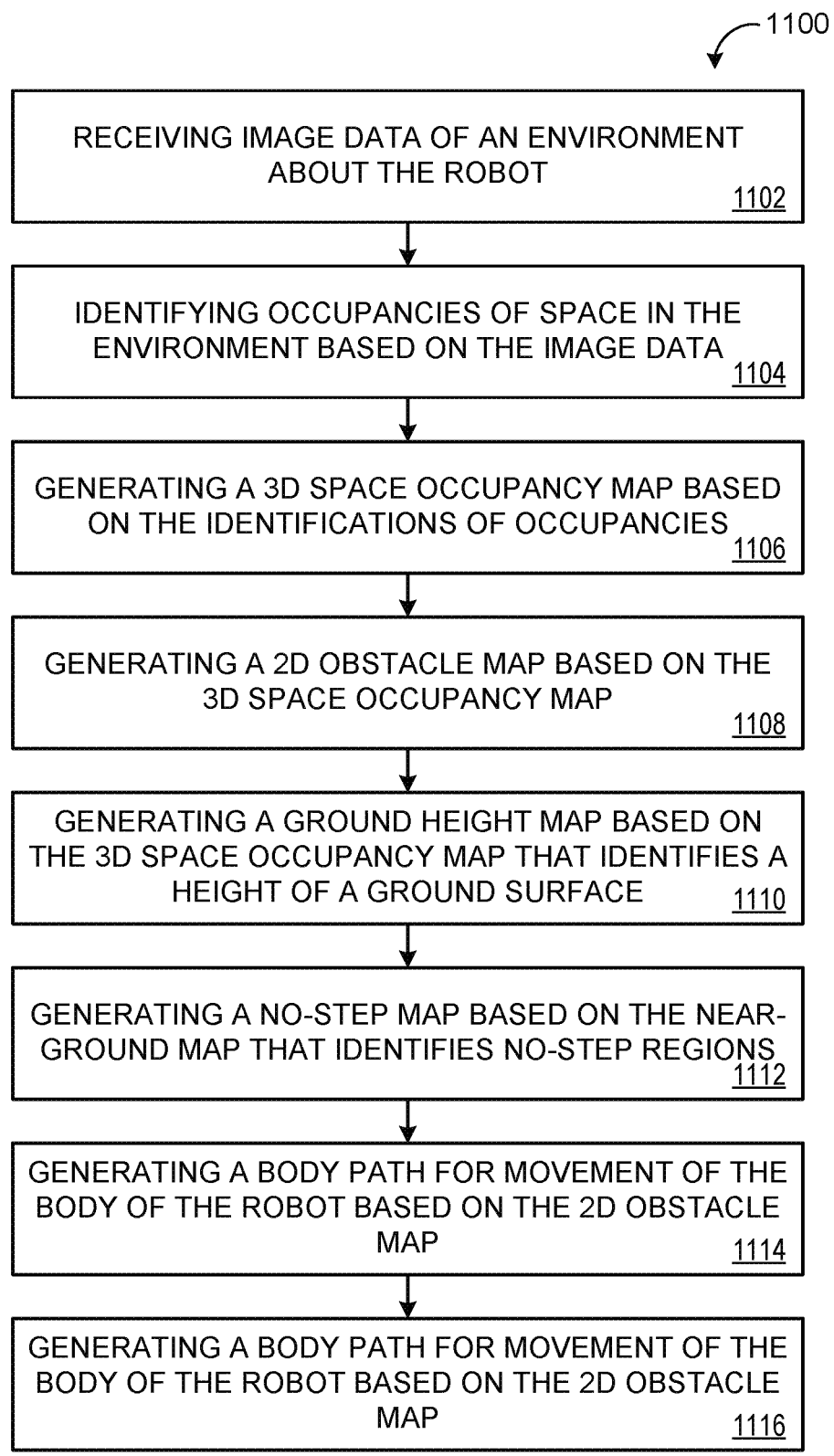
FIG. 11 is a flowchart of another example method for terrain and constraint planning for a step plan.

FIG. 11 is a flowchart of another example method 1100 for terrain and constraint planning a step plan. The flowchart starts at operation 1102 by receiving, at data processing hardware 36 of a robot 10, image data 17 of an environment 8 about the robot 10 from at least one image sensor 31. The image sensor 31 may include one or more of a stereo camera, a scanning light-detection and ranging (LIDAR) sensor, or a scanning laser-detection and ranging (LADAR) sensor. In some implementations, the image data 17 includes three-dimensional point cloud data captured by a three-dimensional volumetric image sensor. The robot 10 includes a body 11 and legs 12. The method 1100, at step 1104, includes identifying, by the data processing hardware 36, occupancies of space in the environment 8 based on the image data 17. At step 1106, the method 1100 includes generating, by the data processing hardware 36, a three-dimensional space occupancy map 200 based on the identification of occupancies of space in the environment 8. In some examples, the three-dimensional space occupancy map 200 includes a voxel map 200, 200a having voxels 212, each voxel 212 representing a three-dimensional space of the environment 8. Each voxel 212 may be classified as either a ground surface 9, an obstacle, or other. At step 1108, the method 1100 includes generating, by the data processing hardware 36, a two-dimensional body-obstacle map 112 based on the three-dimensional space occupancy map 200. At step 1110, the method 1100 includes generating, by the data processing hardware 36, a ground height map 116 based on the three-dimensional space occupancy map 200. The ground height map 116 identifies a height of the ground surface 9 at each location near the robot 10.

The method 1100, at step 1112, includes generating, by the data processing hardware 36, a step-obstacle map 114 based on the ground height map 116, the step-obstacle map 114 identifying no-step regions 620 in the environment 8 where the robot 10 should not step. At step 1114, the method 1100 includes generating, by the data processing hardware 36, a body path 510 for movement of the body 11 of the robot 10 when maneuvering the robot 10 in the environment based on the two-dimensional body-obstacle map 112. In some examples, the body path 510 is based on no-body regions designated in the two-dimensional body-obstacle map 112. At step 1116, the method 1100 includes generating, by the data processing hardware 36, a step path 350 for movement of the legs 12 of the robot 10 when maneuvering the robot 10 in the environment 8 based on the body path 510, the body-obstacle map 112, the step-obstacle map 114, and the ground height map 116. The step path 350 may be based on a nominal step pattern of a nominal gait for the robot 10 and step constraints 342. Generating the step path 350 for the legs 12 of the robot 10, in some implementations, includes refining the generated body path 510. The step constraints 342, in some implementations, include at least one of: a threshold range of a center of pressure offset for each leg 12 in contact with the ground surface, where the center of pressure offset indicates an acceptable amount of robot weight distribution for each leg 12 at each step; whether the step path 350 causes a leg 12 to step into a no-step region 213f the step-obstacle map 114; whether the step path 350 causes the body 11 of the robot 10 to enter a body obstacle; whether the step path 350 causes a self-collision of the robot 10; or a margin of space about any no-step region 213 of the step-obstacle map 114. Optionally, the step constraints 342 include soft constraints or weighted constraints.

In some implementations, the method 1100 includes filtering, by the data processing hardware 36, the three-dimensional space occupancy map 200 to generate the two-dimensional body-obstacle map 112. The filtering may fill in gaps around incompletely observed obstacles and/or remove spurious data from the map 112.

Figure 12:
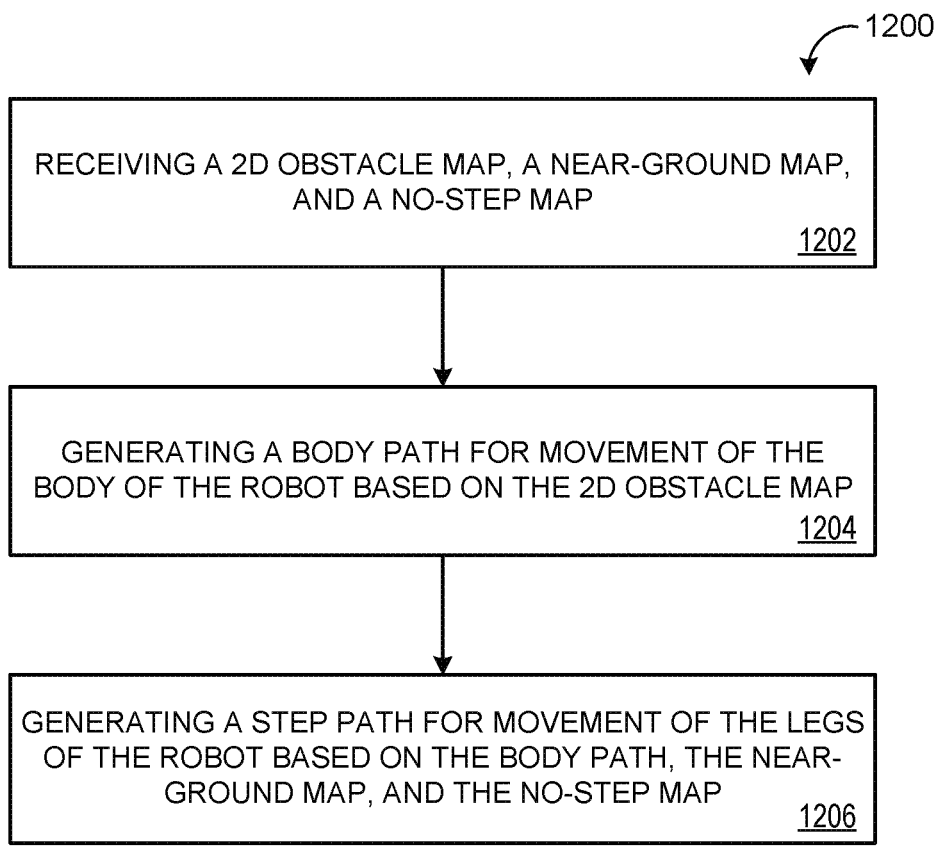
FIG. 12 is a flowchart of another example method for terrain and constraint planning for a step plan.

FIG. 12 is a flowchart of another example method 1200 for terrain and constraint planning a step plan. The flowchart starts at operation 1202 by receiving, at data processing hardware 36 of a robot 10, a two-dimensional body-obstacle map 112, a step-obstacle map 114, and a ground height map 116. Here, the data processing hardware 36 of the robot 10 may obtain the maps 112, 114, 116 from a remote device in communication with the data processing hardware. For instance, the remote device may receive the image data 17 (FIG. 1) from the vision system 30 (FIG. 1) of the robot 10 and generate the maps 112, 114, 116 based on the image data 17, as discussed above with reference to FIG. 1. The ground height map 116 identifies a height of the ground surface 9 at each location near the robot 10. The step-obstacle map 114 identifies where in the environment 8 the robot 10 should not step. The method 1200, at step 1204, includes generating, by the data processing hardware 36, a body path 510 for movement of the body 11 of the robot 10 when maneuvering the robot 10 in the environment 8 based on the two-dimensional body-obstacle map 112. At step 1206, the method 1200 includes generating, by the data processing hardware 36, a step path 350 for movement of the legs 12 of the robot 10 when maneuvering the robot 10 in the environment 8 based on the body path 510, the body-obstacle map 112, the ground height map 116, and the step-obstacle map 114.

Figure 13:
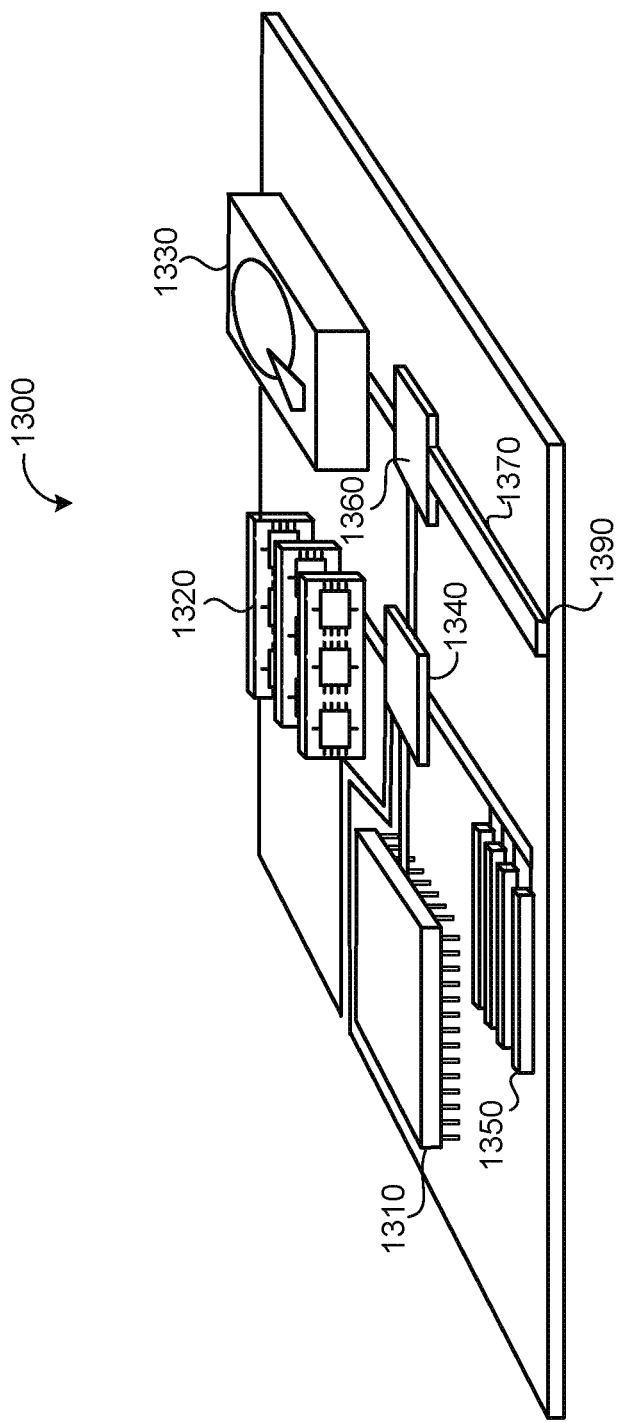
FIG. 13 is a schematic view of an example computing device that may be used to implement the systems and methods described herein.

FIG. 13 is schematic view of an example computing device 1300 that may be used to implement the systems and methods described in this document (e.g., data processing hardware 36 and memory hardware 20). The components shown here, their connections and relationships, and their functions, are meant to be exemplary only, and are not meant to limit implementations of the inventions described and/or claimed in this document.

The computing device 1300 includes a processor 1310 (e.g., data processing hardware 36), memory 1320 (e.g., memory hardware 38), a storage device 1330, a high-speed interface/controller 1340 connecting to the memory 1320 and high-speed expansion ports 1350, and a low speed interface/controller 1360 connecting to a low speed bus 1370 and a storage device 1330. Each of the components 1310, 1320, 1330, 1340, 1350, and 1360, are interconnected using various busses, and may be mounted on a common motherboard or in other manners as appropriate. The processor 1310 can process instructions for execution within the computing device 1300, including instructions stored in the memory 1320 or on the storage device 1330 to display graphical information for a graphical user interface (GUI) on an external input/output device, such as a display 1380 coupled to high speed interface 1340. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1320 stores information non-transitorily within the computing device 1300. The memory 1320 may be a computer-readable medium, a volatile memory unit(s), or non-volatile memory unit(s). The non-transitory memory 1320 may be physical devices used to store programs (e.g., sequences of instructions) or data (e.g., program state information) on a temporary or permanent basis for use by the computing device 1300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1330 is capable of providing mass storage for the computing device 1300. In some implementations, the storage device 1330 is a computer-readable medium. In various different implementations, the storage device 1330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1320, the storage device 1330, or memory on processor 1310.

The high speed controller 1340 manages bandwidth-intensive operations for the computing device 1300, while the low speed controller 1360 manages lower bandwidth-intensive operations. Such allocation of duties is exemplary only. In some implementations, the high-speed controller 1340 is coupled to the memory 1320 and to the high-speed expansion ports 1350, which may accept various expansion cards (not shown). In some implementations, the low-speed controller 1360 is coupled to the storage device 1330 and a low-speed expansion port 1390. The low-speed expansion port 1390, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a robot causes the data processing hardware to perform operations, the robot comprising a body and legs coupled to the body, the operations comprising:
    obtaining a body-obstacle map identifying body obstacles present in an environment of the robot, each body obstacle representative of a body object in the environment that may collide with the body of the robot;
    obtaining a step-obstacle map identifying step obstacles present in the environment, each step obstacle representative of a step object in the environment that may collide with the legs of the robot;
    generating, using the body-obstacle map and without using the step-obstacle map, a body path defining a path for movement of the body of the robot from a body path start to a body path destination;
    generating, using the body path, a step path defining step positions for the legs of the robot along the body path; and
    determining, using the step-obstacle map, an adjusted step path, the adjusted step path avoiding collisions between the legs of the robot and the step obstacles encountered by the robot as the body of the robot travels along the body path.

2. The method of claim 1, wherein generating the step path comprises determining, based on the step-obstacle map, an initial gait pattern having an initial gait timing.

3. The method of claim 2, wherein determining the initial gait pattern comprises selecting the initial gait pattern from a plurality of initial gait patterns, each initial gait pattern of the plurality of initial gait patterns having a corresponding initial gait timing.

4. The method of claim 3, wherein:
    each respective initial gait pattern of the plurality of initial gait patterns is weighted based on a respective quality of the step positions for the legs of the robot along the step path using the respective initial gait pattern; and
    selecting the initial gait pattern is based on the respective qualities of the step positions for the legs of the robot along the step path using the respective initial gait patterns.

5. The method of claim 1, wherein determining the adjusted step path is based on one or more step constraints.

6. The method of claim 5, wherein:
    the one or more step constraints include:
        one or more hard constraints that the adjusted step path cannot violate; and
        one or more soft constraints, whereby each respective soft constraint of the one or more soft constraints is weighted based on a respective cost of the adjusted step path violating the respective soft constraint; and
    determining the adjusted step path is based on the respective costs of the adjusted step path violating the respective soft constraints.

7. The method of claim 6, wherein:
    the adjusted step path violates at least one of the one or more soft constraints; and
    the respective cost corresponding to each violated soft constraint is less than a threshold cost.

8. The method of claim 6, wherein:
    the adjusted step path violates at least one of the one or more soft constraints; and
    a sum of the respective costs corresponding to each violated soft constraint is less than a threshold cost.

9. The method of claim 5, wherein the one or more step constraints comprise at least one of:
    a threshold range of a center of pressure offset for each leg in contact with a ground surface, the center of pressure offset indicating an acceptable amount of robot weight distribution for each leg at each step position;
    whether the adjusted step path causes a leg to step into a no-step region of the step-obstacle map;
    whether the adjusted step path causes the body of the robot to enter a no-body region of the body-obstacle map;
    whether the adjusted step path causes a self-collision of the robot; or
    a margin of space about any no-step region of the step-obstacle map.

10. The method of claim 1, wherein the operations comprise determining, using the adjusted step path, an adjusted body path, the adjusted body path based on movement of the body of the robot as the legs of the robot travel along the adjusted step path.

11. A robot comprising:
    a body;
    legs coupled to the body and configured to maneuver the robot about an environment of the robot;

data processing hardware in communication with the legs; and memory hardware in communication with the data processing hardware, the memory hardware storing instructions that when executed on the data processing hardware cause the data processing hardware to perform operations comprising:

obtaining a body-obstacle map identifying body obstacles present in the environment, each body obstacle representative of a body object in the environment that may collide with the body of the robot;

obtaining a step-obstacle map identifying step obstacles present in the environment, each step obstacle representative of a step object in the environment that may collide with the legs of the robot;

generating, using the body-obstacle map and without using the step-obstacle map, a body path defining a path for movement of the body of the robot from a body path start to a body path destination;

generating, using the body path, a step path defining step positions for the legs of the robot along the body path; and determining, using the step-obstacle map, an adjusted step path, the adjusted step path avoiding collisions between the legs of the robot and the step obstacles encountered by the robot as the body of the robot travels along the body path.

12. The robot of claim 11, wherein generating the step path comprises determining, based on the step-obstacle map, an initial gait pattern having an initial gait timing.

13. The robot of claim 12, wherein determining the initial gait pattern comprises selecting the initial gait pattern from a plurality of initial gait patterns, each initial gait pattern of the plurality of initial gait patterns having a corresponding initial gait timing.

14. The robot of claim 13, wherein:

each respective initial gait pattern of the plurality of initial gait patterns is weighted based on a respective quality of the step positions for the legs of the robot along the step path using the respective initial gait pattern; and selecting the initial gait pattern is based on the respective qualities of the step positions for the legs of the robot along the step path using the respective initial gait patterns.

15. The robot of claim 11, wherein determining the adjusted step path is based on one or more step constraints.

16. The robot of claim 15, wherein:

the one or more step constraints include:

one or more hard constraints that the adjusted step path cannot violate; and one or more soft constraints, whereby each respective soft constraint of the one or more soft constraints is weighted based on a respective cost of the adjusted step path violating the respective soft constraint; and determining the adjusted step path is based on the respective costs of the adjusted step path violating the respective soft constraints.

17. The robot of claim 16, wherein:

the adjusted step path violates at least one of the one or more soft constraints; and the respective cost corresponding to each violated soft constraint is less than a threshold cost.

18. The robot of claim 16, wherein:

the adjusted step path violates at least one of the one or more soft constraints; and a sum of the respective costs corresponding to each violated soft constraint is less than a threshold cost.

19. The robot of claim 15, wherein the one or more step constraints comprise at least one of:

a threshold range of a center of pressure offset for each leg in contact with a ground surface, the center of pressure offset indicating an acceptable amount of robot weight distribution for each leg at each step position;

whether the adjusted step path causes a leg to step into a no-step region of the step-obstacle map;

whether the adjusted step path causes the body of the robot to enter a no-body region of the body-obstacle map;

whether the adjusted step path causes a self-collision of the robot; or a margin of space about any no-step region of the step-obstacle map.

20. The robot of claim 11, wherein the operations comprise determining, using the adjusted step path, an adjusted body path, the adjusted body path based on movement of the body of the robot as the legs of the robot travel along the adjusted step path.

* * * * *